US012269729B2

(12) United States Patent
Kocher et al.

(10) Patent No.: US 12,269,729 B2
(45) Date of Patent: Apr. 8, 2025

(54) REUSABLE OR REFILLABLE CONTAINER FOR DISPENSING MOTOR OIL

(71) Applicant: VGP IPCO LLC, Lexington, KY (US)

(72) Inventors: Karl Kocher, Cincinnati, OH (US); Thomas Golinski, Lexington, KY (US); Steven Ruble, Lexington, KY (US)

(73) Assignee: VGP IPCO LLC, Lexington, KY (US)

( * ) Notice: Subject to any disclaimer, the term of this patent is extended or adjusted under 35 U.S.C. 154(b) by 0 days.

(21) Appl. No.: 18/423,668

(22) Filed: Jan. 26, 2024

(65) Prior Publication Data

US 2024/0253970 A1    Aug. 1, 2024

Related U.S. Application Data

(60) Provisional application No. 63/481,948, filed on Jan. 27, 2023.

(51) Int. Cl.
*B67D 7/04* (2010.01)
*B67D 7/14* (2010.01)
*G06Q 10/30* (2023.01)
*G06Q 30/0208* (2023.01)

(52) U.S. Cl.
CPC ............... *B67D 7/04* (2013.01); *B67D 7/14* (2013.01); *G06Q 10/30* (2013.01); *G06Q 30/0208* (2013.01)

(58) Field of Classification Search
CPC .......... G07F 7/06; G07F 7/0609; G07F 13/06; B67D 7/348; B67D 7/04; B67D 7/346; B67D 7/145
USPC .......................................................... 141/18
See application file for complete search history.

(56) References Cited

U.S. PATENT DOCUMENTS

| | | |
|---|---|---|
| 1,290,814 A | 1/1919 | Weaver |
| 1,542,780 A | 6/1925 | Spaeth |
| 1,829,173 A | 11/1928 | Wertz |
| 1,806,423 A | 5/1931 | Philip |
| 1,929,231 A | 10/1933 | Yirava |
| 1,955,161 A | 4/1934 | Zerk |
| 2,203,710 A | 6/1940 | Young et al. |
| 2,606,696 A | 8/1952 | Miner |
| 3,232,379 A | 2/1966 | Mueller et al. |

(Continued)

FOREIGN PATENT DOCUMENTS

| | | |
|---|---|---|
| BR | 202012028127 U2 | 11/2014 |
| CH | 222217 A | 7/1942 |

(Continued)

OTHER PUBLICATIONS

US 11,040,869 B2, 06/2021, Bloom et al. (withdrawn)

(Continued)

*Primary Examiner* — Timothy P. Kelly
(74) *Attorney, Agent, or Firm* — Benesch Friedlander Coplan & Aronoff LLP

(57) ABSTRACT

A motor oil change system includes refillable motor oil containers and one or more motor oil refill systems. Each of the one or more oil refill systems includes a user interface configured to receive data that allows for determination of a type and an amount of motor oil for a refill. The motor oil change system further includes a dispenser configured to dispense the motor oil into one of the refillable motor oil containers based on the determination.

15 Claims, 22 Drawing Sheets

(56) References Cited

U.S. PATENT DOCUMENTS

| | | |
|---|---|---|
| 3,867,999 A | 2/1975 | Cox |
| 4,085,821 A | 4/1978 | Kast et al. |
| 4,520,901 A | 6/1985 | Borup et al. |
| 5,085,188 A | 2/1992 | Gasparri et al. |
| 5,125,540 A | 6/1992 | Rodriguez |
| 5,163,586 A | 11/1992 | Zinsmeyer |
| 5,409,084 A | 4/1995 | Graf |
| 5,497,852 A | 3/1996 | Little et al. |
| 5,598,901 A | 2/1997 | Graf |
| 5,612,890 A | 3/1997 | Strasser et al. |
| 5,732,794 A | 3/1998 | Orlitzky |
| 5,941,418 A | 8/1999 | Box et al. |
| 6,012,551 A | 1/2000 | Raab |
| 6,073,666 A | 6/2000 | Clark |
| 6,125,969 A | 10/2000 | Graf et al. |
| 6,216,822 B1 | 4/2001 | May et al. |
| 6,354,816 B1 | 3/2002 | Yang |
| 6,408,985 B1 | 6/2002 | Orlitzky et al. |
| 6,585,009 B2 | 7/2003 | Matthews et al. |
| 6,601,738 B2 | 8/2003 | Weigand et al. |
| 6,659,306 B2 | 12/2003 | Boyle et al. |
| 6,776,024 B2 | 8/2004 | Jakoby |
| 7,070,067 B1 | 7/2006 | Buchanan et al. |
| 7,395,803 B2 | 7/2008 | Ledger et al. |
| 8,424,722 B2 | 4/2013 | Koch et al. |
| 8,464,837 B2 | 6/2013 | Algulin et al. |
| 8,844,680 B2 | 9/2014 | Alguera et al. |
| 9,512,962 B2 | 12/2016 | Alekseyev et al. |
| 9,625,092 B2 | 4/2017 | Alekseyev et al. |
| 9,689,530 B2 | 6/2017 | Lehnert et al. |
| 10,376,911 B2 | 8/2019 | Bauck |
| 10,449,933 B2* | 10/2019 | Barnes ............ F01P 11/14 |
| 10,577,239 B2 | 3/2020 | Thibodeau et al. |
| 10,850,964 B2 | 12/2020 | Bhaskar et al. |
| 11,105,464 B2 | 8/2021 | Letscher et al. |
| 11,116,363 B2 | 9/2021 | Bradley |
| 11,192,137 B2 | 12/2021 | Shang et al. |
| 11,199,293 B2 | 12/2021 | Gibson et al. |
| 11,401,150 B2 | 8/2022 | Leeds et al. |
| 2004/182183 A1 | 9/2004 | Brand et al. |
| 2005/0184084 A1 | 8/2005 | Wells |
| 2010/0200609 A1 | 8/2010 | Cadigan |
| 2012/0150552 A1 | 6/2012 | Belady et al. |
| 2013/0199662 A1* | 8/2013 | Gebbink ............ B67D 7/3209 141/2 |
| 2013/0228623 A1* | 9/2013 | Virella ............ G07F 7/0609 235/454 |
| 2014/0053950 A1* | 2/2014 | Vandersteen ........... G07F 9/002 222/2 |
| 2015/0232319 A1* | 8/2015 | Wedderburn ......... B67D 7/005 138/89 |
| 2017/0022045 A1* | 1/2017 | Ray ............ G07F 13/025 |
| 2017/0173613 A1 | 6/2017 | Hove et al. |
| 2018/0057201 A1* | 3/2018 | Levenstein ......... G06K 19/0723 |
| 2018/0087418 A1* | 3/2018 | Cadigan ............ F01M 11/0458 |
| 2020/0062581 A1 | 2/2020 | Centofante et al. |
| 2021/0033007 A1* | 2/2021 | Apostolides ....... F01M 11/0458 |
| 2021/0088540 A1 | 3/2021 | Ochs et al. |
| 2021/0102663 A1 | 4/2021 | Wawrzola et al. |
| 2021/0102664 A1 | 4/2021 | Wawrzola et al. |
| 2021/0199240 A1 | 7/2021 | Wawrzola et al. |
| 2021/0199241 A1 | 7/2021 | Wawrzola et al. |
| 2022/0112981 A1 | 4/2022 | Eisenbacher et al. |
| 2022/0161499 A1 | 5/2022 | Abushall et al. |

FOREIGN PATENT DOCUMENTS

| | | |
|---|---|---|
| CN | 2274154 Y | 2/1998 |
| CN | 2832599 Y | 11/2006 |
| CN | 1325301 C | 7/2007 |
| CN | 201011411 Y | 1/2008 |
| CN | 201395144 Y | 2/2010 |
| CN | 201697668 U | 1/2011 |
| CN | 202082577 U | 12/2011 |
| CN | 101900590 B | 4/2012 |
| CN | 202621065 U | 12/2012 |
| CN | 102166998 B | 4/2013 |
| CN | 202991173 U | 6/2013 |
| CN | 203020235 U | 6/2013 |
| CN | 203347886 U | 12/2013 |
| CN | 103821581 A | 5/2014 |
| CN | 102275552 B | 1/2015 |
| CN | 204420533 U | 6/2015 |
| CN | 103292852 B | 10/2015 |
| CN | 105937700 A | 9/2016 |
| CN | 105179085 B | 11/2017 |
| CN | 107450370 A | 12/2017 |
| CN | 105135194 B | 2/2018 |
| CN | 108534870 A | 9/2018 |
| CN | 208587720 U | 3/2019 |
| CN | 208980321 U | 6/2019 |
| CN | 109973798 A | 7/2019 |
| CN | 110043784 A | 7/2019 |
| CN | 209638747 U | 11/2019 |
| CN | 209638753 U | 11/2019 |
| CN | 209839647 U | 12/2019 |
| CN | 210662251 U | 6/2020 |
| CN | 108894884 B | 7/2020 |
| CN | 109252993 B | 11/2020 |
| CN | 212298493 U | 1/2021 |
| CN | 110120112 B | 6/2021 |
| CN | 113007579 A | 6/2021 |
| CN | 113074798 A | 7/2021 |
| CN | 215633457 U | 1/2022 |
| CN | 114000956 A | 2/2022 |
| CN | 216113306 U | 3/2022 |
| CN | 114320525 A | 3/2023 |
| CO | 6320140 A1 | 9/2011 |
| DE | 1450239 U | 5/1969 |
| DE | 9012900 U1 | 1/1991 |
| DE | 4028734 A1 | 3/1992 |
| DE | 4123043 A1 | 1/1993 |
| DE | 9317271 U1 | 2/1994 |
| DE | 102008055901 A1 | 6/2009 |
| DE | 102016123117 A1 | 6/2017 |
| EP | 0368430 B1 | 3/1994 |
| EP | 0678152 B1 | 8/1997 |
| EP | 1209038 B1 | 4/2004 |
| EP | 1080993 B1 | 8/2005 |
| EP | 1582706 B1 | 7/2008 |
| EP | 1626225 B1 | 2/2012 |
| EP | 2333397 B1 | 3/2013 |
| EP | 2825810 A1 | 1/2015 |
| EP | 3724464 A4 | 8/2021 |
| EP | 3724465 A4 | 9/2021 |
| EP | 3872385 A1 | 9/2021 |
| ES | 1037473 Y | 10/1998 |
| FR | 2697073 B3 | 9/1994 |
| FR | 2803872 A1 | 7/2001 |
| GB | 520236 A | 4/1940 |
| GB | 1047342 A | 1/1963 |
| GB | 2034416 S | 10/1993 |
| GB | 2463948 A | 4/2010 |
| JP | 2607730 B2 | 5/1997 |
| JP | 2599045 Y2 | 8/1999 |
| JP | 2607730 Y2 | 7/2002 |
| JP | 2002264999 A | 9/2002 |
| JP | 3635076 B2 | 3/2005 |
| JP | 4022295 B2 | 12/2007 |
| JP | 200906857 A | 4/2009 |
| KR | 100373640 B1 | 12/1998 |
| KR | 100166277 B1 | 1/1999 |
| KR | 1020040025356 A | 3/2004 |
| KR | 1020040046202 A | 6/2004 |
| KR | 2020080000621 U | 4/2008 |
| KR | 100863328 B1 | 10/2008 |
| KR | 1020120083058 A | 7/2012 |
| KR | 101436064 B1 | 9/2014 |
| KR | 1020160060953 A | 5/2016 |
| KR | 2020180002833 U | 10/2018 |
| KR | 102009956 B1 | 8/2019 |
| KR | 102021941 B1 | 9/2019 |

(56) References Cited

FOREIGN PATENT DOCUMENTS

| WO | 2012034419 A1 | 3/2012 |
| WO | 2020213851 A1 | 10/2020 |
| WO | 2022000037 A1 | 1/2022 |

OTHER PUBLICATIONS

CN106297023A with AI Translation (Year: 2024).*
International Search Report and Written Opinion issued in International Application No. PCT/US24/13062, Jun. 27, 2024.

* cited by examiner

REUSABLE OR REFILLABLE CONTAINER FOR DISPENSING MOTOR OIL

CROSS REFERENCE TO RELATED APPLICATIONS

The present application claims priority to U.S. Provisional Patent Application No. 63/481,948, filed on Jan. 27, 2023, the entire contents of which are incorporated herein by reference.

FIELD OF INVENTION

The present disclosure generally relates to systems and methods for dispensing and refilling motor oil.

BACKGROUND

Consumers purchase motor oil in containers that are intended to be thrown away or recycled. Although recycling is more environmentally friendly, the recycling process adds to environmental and financial costs.

SUMMARY

In one embodiment, a motor oil change system includes refillable motor oil containers and one or more motor oil refill systems. Each of the one or more oil refill systems includes a user interface configured to receive data that allows for determination of a type and an amount of motor oil for a refill. The motor oil change system further includes a dispenser configured to dispense the motor oil into one of the refillable motor oil containers based on the determination.

In another embodiment, a method of changing motor oil includes obtaining information to determine a type and an amount of motor oil to be refilled using a motor oil refill system. The method further includes dispensing the determined motor oil into a refillable container in precision at point-of-purchase.

In another embodiment, a refillable motor oil container includes an opening configured to couple to a motor oil dispenser of a motor oil refill system to receive motor oil into the refillable container. The refillable motor oil container further includes an information tag containing data that allows the motor oil refill system to determine a type and an amount of motor oil for a refill.

DETAILED DESCRIPTION

Figure 1:
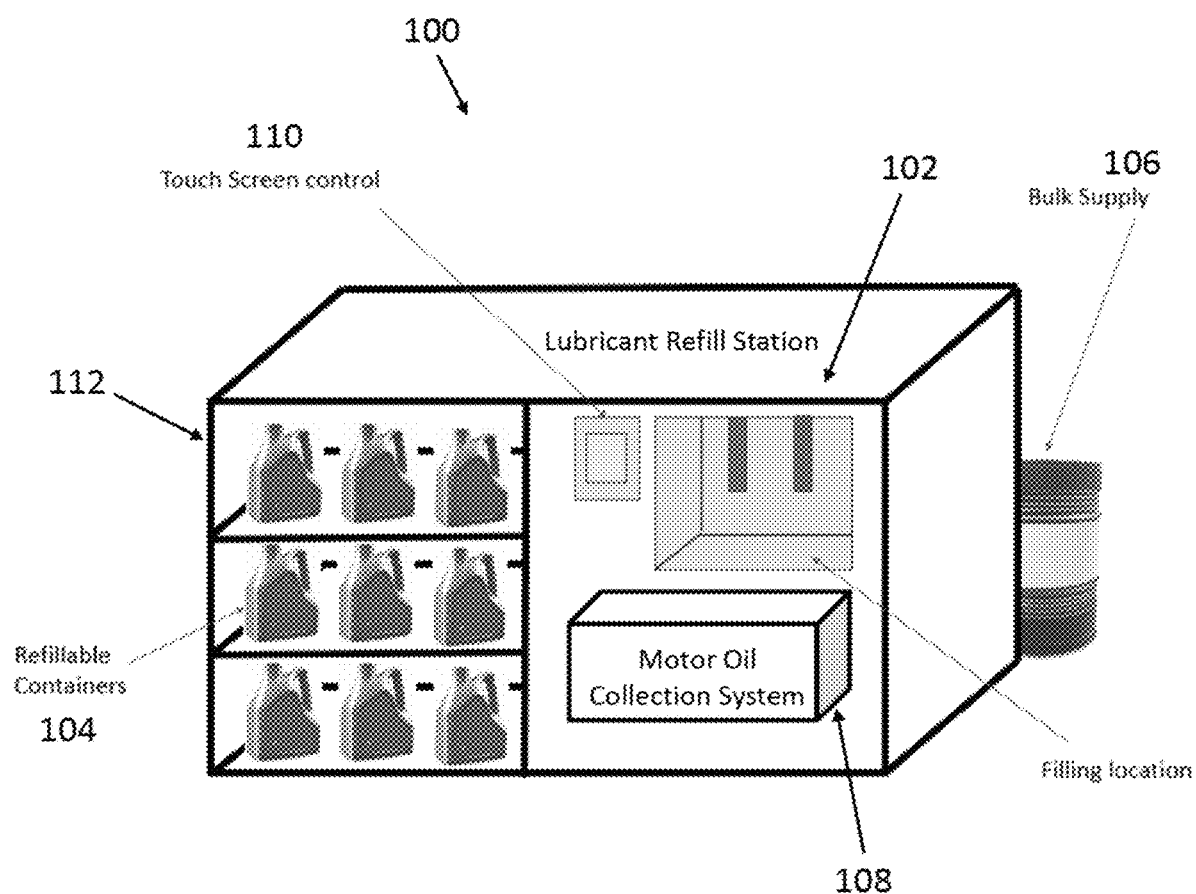
FIG. 1 is a drawing illustrating an example of a motor oil refill system.

The present disclosure is not limited in terms of the particular embodiments described in this application, which are intended as illustrations of various aspects only. Many modifications and variations can be made without departing from the scope of the invention, as will be apparent to those skilled in the art. Functionally equivalent methods within the scope of the disclosure, in addition to those enumerated herein, will be apparent to those skilled in the art from the following descriptions. Such modifications and variations are intended to fall within the scope of the appended claims. The terminology used herein is for the purpose of describing particular embodiments only and is not intended to be limiting.

The present disclosure generally relates to systems and methods for dispensing motor (lubricant) oil into a refillable container. Currently, motor oil is purchased in a container. After the motor oil is used, the container is thrown away, which creates environmental wastes. Recycling of the used motor oil containers may be done but once the container is in contact with motor oil, the container is not desirable for recycling and the recycling process is environmentally and financially costly.

The systems and methods disclosed herein provide more environmental and economical approaches to supply motor oil to consumers. In one example, a motor oil refill system or station disclosed herein dispenses motor oil into a reusable or refillable container. The motor oil refill system also enables consumers to get an exact fill based on the vehicle type, as opposed to having to buy an imprecise amount as is practiced today. The motor oil refill systems and methods disclosed herein are also suitable for dispensing lubricants other than motor oil.

In one example, the motor oil refill system is designed to utilize a refillable container/bottle, intended to contain vehicle lubricant, in conjunction with an integrated operating system as an interface with consumers. This interface enables consumers to input their vehicle make/model information which in turn prompts the narrowed selection of specific grades/lubricants required by the Original Equipment Manufacturer (OEM) for their specific vehicle. After finalizing the selection, the container/bottle is then filled with precisely the right amount, based on OEM recommendation for lubricant fill volumes. This enables the consumers to only pay for the precise amount of lubricant required for their specific need. This also reduces impacts on the environment and logistical systems involved since bulk oil will be the primary method to deliver smaller amounts to consumers at the point-of-purchase. Consumers also receive a benefit in terms of cost since they're not paying for unused product and when completing services no longer have to precisely measure the amount used during the service since the correct amount of lubricant was dispensed at point-of-purchase. This is opposed to the current lubricant purchase setup that only allows consumers to select either a 1 quart, 1 gallon, or 5 quart package, which may be more than needed for the service.

Additionally, the motor oil refill system could be integrated with a motor oil collection or recycle system to enable easier collection of used motor oil/lubricant prior to dispensing new motor oil/lubricant. The container/bottle for this system is intended to be a durable good to reduce environmental impact as opposed to constantly discarding single use packaging.

FIG. 1 shows an example of a motor (lubricant) oil refill system 100. The motor oil refill system 100 includes a dispensing system 102 configured to dispense selected motor oil into a refillable container 104. The refillable container 104 is used to contain new motor oil. The motor oil refill system 100 includes a supply system 106 configured to store motor oil in bulk. The motor oil refill system 100 may include a motor oil collection system 108 configured to collect used motor oil. The dispensing system 102 includes a user interface 110 (e.g., a display screen, a menu screen, a touch screen, a bar code scanner, an infrared ID receiver, or a combination thereof) that enables a user to operate, control, and/or communicate information to the dispensing system 102. The motor oil refill system 100 may include a shelf 112 to secure/store multiple refillable containers 104.

The dispensing system 102 includes an appropriate computer environment (e.g., processor, controller, receiver/detector, etc.) to perform the refilling processes disclosed herein.

The dispensing system 102 includes one or more dispensers, such as nozzles, in fluid communication with the supply system 106. In one embodiment, each of the one or more dispensers may be designed to dispense a particular type (e.g., particular chemistry, product, brand, grade, etc.) of motor oil, allowing users to refill the motor oil of the respective type. In one embodiment, each of the one or more dispensers may be designed to dispense any user selected motor oil type. The dispensing system 102 is designed to dispense any selected amount of motor oil in precision at point-of-purchase, e.g., any number of multiplication or fraction of 1 quart or 1 gallon, 0.9 quart, 0.8 quart, 0.7 quart, 0.6 quart, 0.5 quart, 0.4 quart, 0.3 quart, 0.2 quart, or 0.1 quart. The one or more dispensers are designed to have suitable geometries to refill motor oil into the opening of the refillable container 104.

Figure 2:
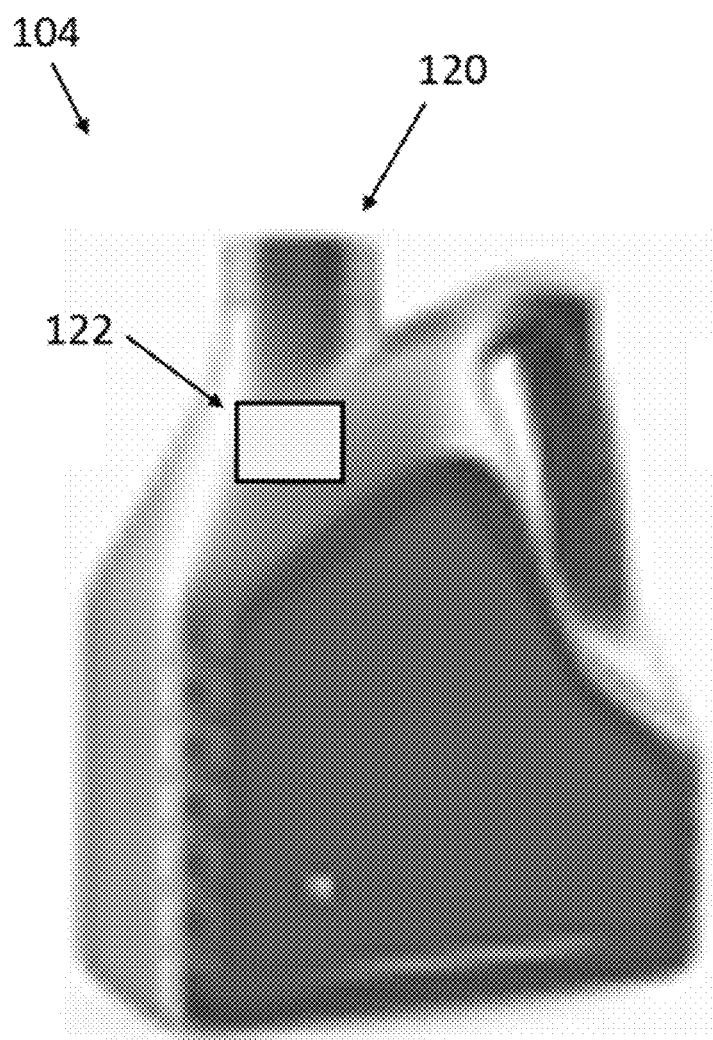
FIG. 2 is a drawing illustrating an example of a refillable container that can be used to refill motor oil dispensed by the motor oil refill system of FIG. 2.

The refillable container 104 is made of durable materials to contain motor oil and be reused. The refillable container 104 may be made of materials selected from metals, plastics, recycled materials, polymers, materials suitable for injection molding, any forms of sustainable materials, or a combination thereof. The refillable container 104 may be specifically designed to be used with the motor oil refill system 100. FIG. 2 shows an example of the refillable container 104 that includes an opening 120 configured to be coupled to the dispensing system 102 to receive the motor. The opening 120 may include mechanism to latch onto the dispensers/nozzles.

The refillable container 104 may include a container information tag 122. Based on the information retrievable from the container information tag 122, the dispensing system 102 can determine and dispense the appropriate amounts/types of motor oil. The container information tag 122 may be a scannable tag or an automatic identification and data capture tag, e.g., a matrix barcode, a two-dimensional barcode, a quick response code (QR) code, a radio-frequency identification (RFID) code, etc.

The information or data retrievable from the container information tag 122 may include, but are not limited to, vehicle information (e.g., model and make of vehicle), motor oil information (e.g., compatible motor oil products, grades, and types for the particular vehicle), and refillable container information (e.g., material, size, and capacity of the refillable container 104).

The refillable container 104 may be designed to be used for a particular motor oil or for any motor oil. The refillable container 104 may be designed to be used for a particular vehicle type/make or for any vehicle type/make.

The motor oil collection system 108 is designed to allow storing of the used motor oil. The motor oil collection system 108 may include appropriate draining mechanisms to couple to a vehicle to collect used motor oil. The motor oil collection system 108 may include appropriate draining mechanisms (e.g., suction nozzle or pipe, tank, etc.) to couple to and remove used motor oil from a used motor oil container. The motor oil collection system 108 may include appropriate mechanisms (e.g., a volume sensor, a weighing sensor, etc.) to determine an amount of used motor oil recycled or collected. The motor oil collection system 108 may include an appropriate computer environment to determine ownership of the used motor oil container and issue a return vessel credit to the user or consumer. The motor oil collection system 108 may include any suitable reservoirs or vessels to store used motor oil. The motor oil collection system 108 enables easier collection of used motor oil and/or used motor oil containers. In one embodiment, the motor oil collection system 108 may be next to, integrated with, or in proximity to the dispensing system 102. For example, the motor oil collection system 108 and the dispensing system 102 are one system or in proximity to each other such that users can discharge the used motor oil to the motor oil collection system 108 and refill the motor oil dispensed by the dispensing system 102 at one stop. In another embodiment, the motor oil collection system 108 may be at a separation location from the dispensing system 102. For example, the motor oil collection system 108 may be at or in proximity to an oil change and service bay, not in the same room as the dispensing system 102. The motor oil collection system 108 may be capable of recording time and quantity information of the collected used motor oil (e.g., how often or when the last time the used motor oil was discharged, the amount of used motor oil discharged, etc.). The time and quantity information may be communicated to the dispensing system 102 and/or a motor oil management system. In some embodiment, the dispensing system 102 may determine and dispense the appropriate amounts/types of motor oil based on the amounts/types of used oil collected at the motor oil collection system 108.

The user interface 110 may include any suitable mechanisms to obtain or allow users to input information or data for motor oil change. The user interface 110 may include a display screen, a menu screen, a touch screen, a bar code scanner, an infrared ID receiver, or a combination thereof. The user interface 110 may scan or detect the container information tag 122 to determine the type of motor oil and/or the quantity of motor oil to be dispensed. The user interface 110 may allow users to enter or select the type and/or the amount of motor oil to be dispensed. The user interface 110 may prompt (e.g., via visual, textual, and/or voice communications) users to provide information to allow the dispensing system 102 to determine the type and/or amount of motor oil to be dispensed. The user interface 110 may be configured to accept payment associated with the refill. For example, the user interface 110 may include a credit card reader to accept the payment on site or may print or generate a bar code that can be scanned at check out. The payment associated with the refill may include the payment for the dispensed motor oil and/or the payment for purchasing the refillable container 104.

Figure 3:
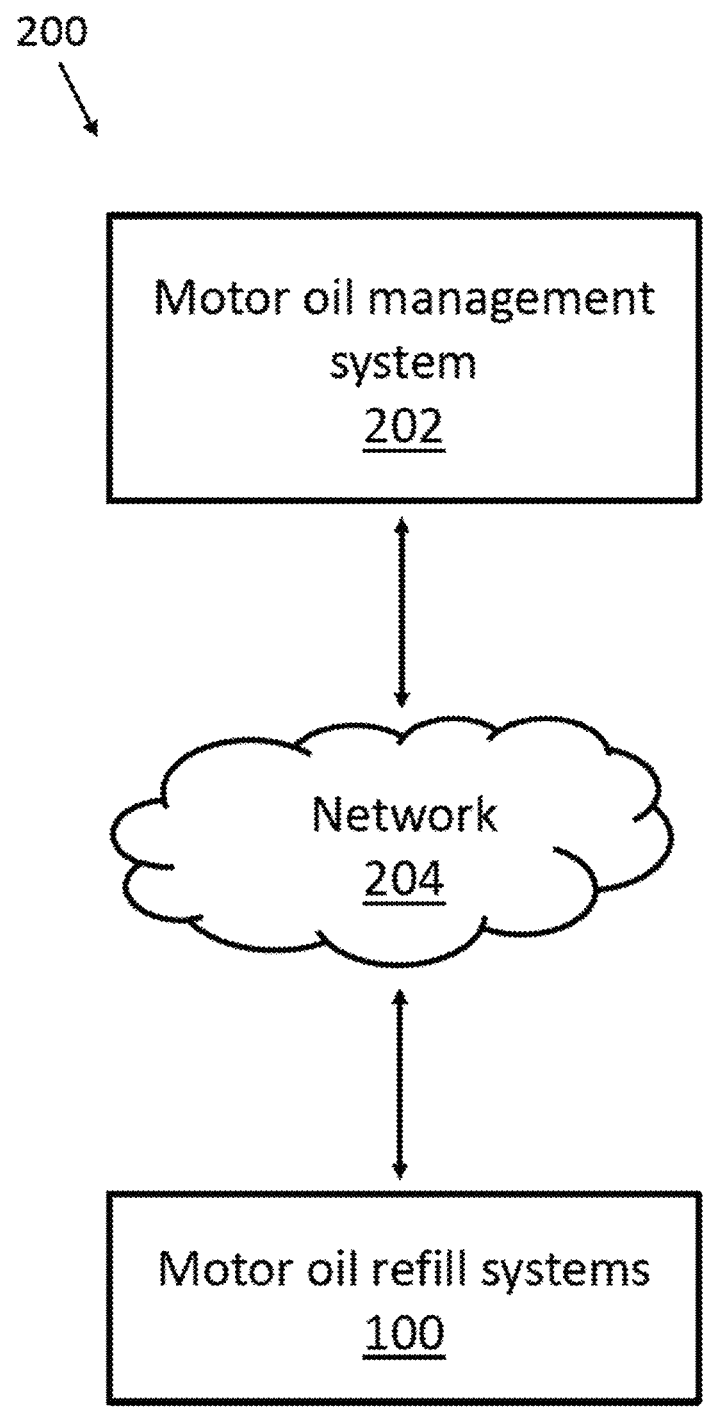
FIG. 3 is a block diagram of an example of networked environment for multiple motor oil refill systems of FIG. 1 in communication with a motor oil management system.

FIG. 3 shows a schematic block diagram of a networked environment 200 for the motor oil refill system 100. The networked environment 200 includes the motor oil refill systems 100 connected to a motor oil management system 202 via a network 204. The network 204 may be any suitable network that allows data communication, such as Internet, wired network, wireless network, cable network, etc. The motor oil refill systems 100 may be at the same or different locations. For example, the motor oil refill systems 100 may be located in the same oil change shop or different oil change shops.

The motor oil refill systems 100 may each communicate data/information about motor oil refills and/or the used motor oil collection information to the motor oil management system 202 via the network 204. The information may include, but are not limited to, type, amount, and time of each motor oil refill and/or used motor oil collection at the motor refill system 100.

The motor oil management system 202 has computer environments appropriate (e.g., processors, memory, algorithms, controllers, etc.) to analyze data/information communicated from the motor oil refill systems 100 and determine motor oil refilling, used motor oil collection, and the respective logistics. The motor oil management system 202 may analyze data/information communicated from the motor oil collection system 108 to determine vessel return credits.

Figure 4:
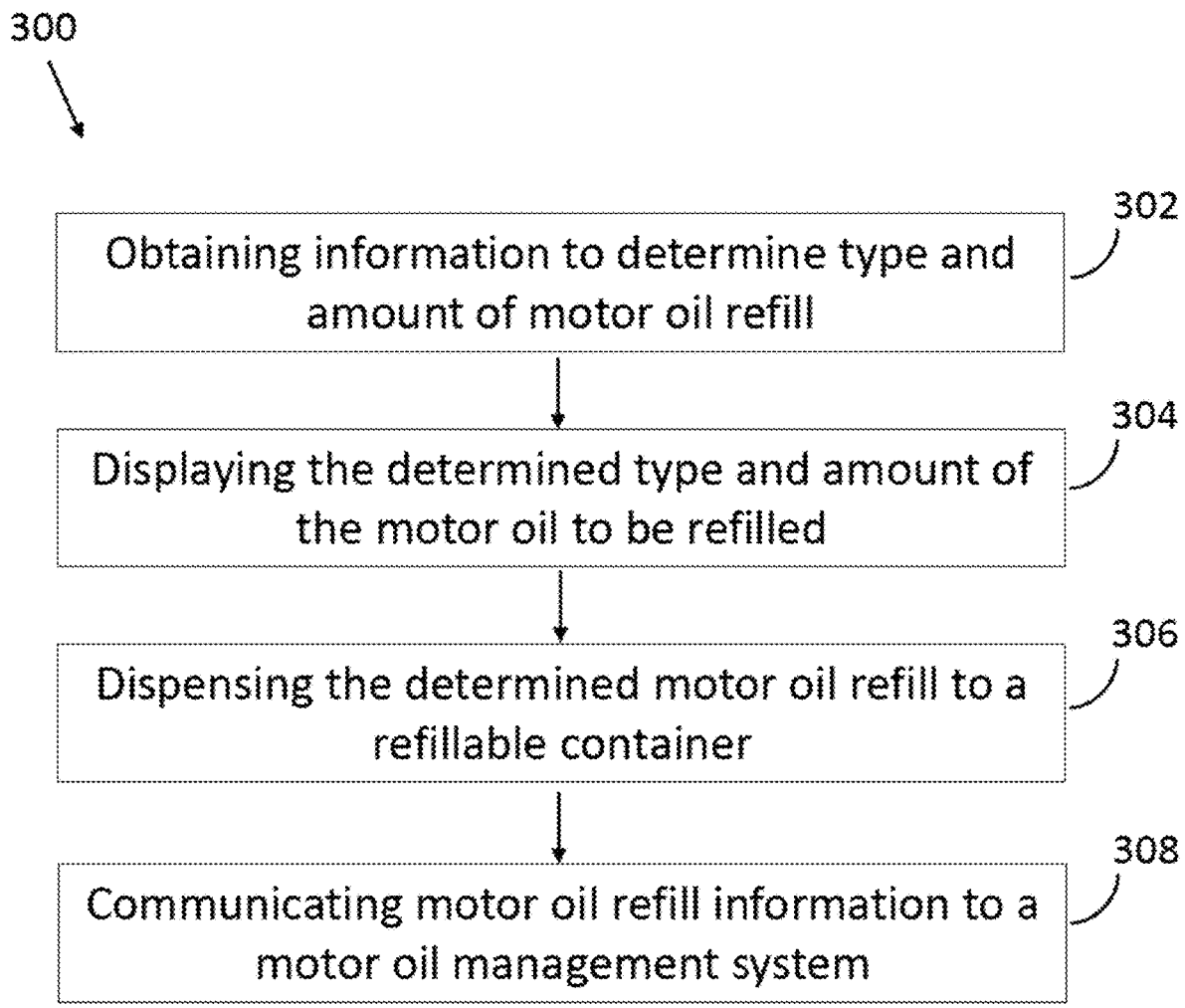
FIG. 4 shows an example process of refilling motor oil.

FIG. 4 shows an example process 300 of using the motor oil refill system 100 to refill motor oil into the refillable container 104. The process 300 includes obtaining information to determine type and amount of motor oil refill (step 302). The information may be obtained through the user interface 110. For example, a user can enter or select from a display menu to indicate the type and amount of motor oil refill needed. For example, a user may provide vehicle information and the motor refill system 100 may determine at least one motor oil for the user to select the type and amount of motor oil to be refilled. For example, the user interface 110 may scan or detect the refillable container 104 (containing the information tag 122) to obtain information allowing the motor refill system 100 to determine type and amount of motor oil refill needed. The determined type of motor oil refill may be based on user's selection, vehicle type/model/make, previous refill history, volume of the refillable container 104, previous refill history, vehicle operation history (e.g., amount of remaining motor oil, motor oil efficiency), amount and type of used motor oil collected at the motor oil collection system 108, etc. The amount of motor oil may be any number of multiplication or fraction of 1 quart or 1 gallon, 0.9 quart, 0.8 quart, 0.7 quart, 0.6 quart, 0.5 quart, 0.4 quart, 0.3 quart, 0.2 quart, or 0.1 quart.

The process 300 includes displaying the determined type and amount of the motor oil to be refilled (step 304). For example, the type and amount of the motor oil to be refilled may be displayed or communicated using the user interface 110.

The process 300 includes dispensing the determined motor oil refill to a refillable container 104 (step 306). The determined motor oil is dispensed via the dispensing system 102.

The process 300 includes communicating motor oil refill information to the motor oil management system 202. The motor oil management system 202 may use the communicated information to determine the logistics for supplying motor oil to the motor oil refill systems 100 and/or to determine the logistics for removing or recycling the used motor oil from the motor oil refill system 100. The motor oil management system 202 may also use the communicated information from the dispensing system 102 and/or the motor oil collection system 108 to determine a discount or credit for the customer or user.

FIG. 5 through FIG. 22 show various aspects of systems and methods for dispensing and refilling motor oil using the motor oil refill systems 100 disclosed herein.

Figure 5:
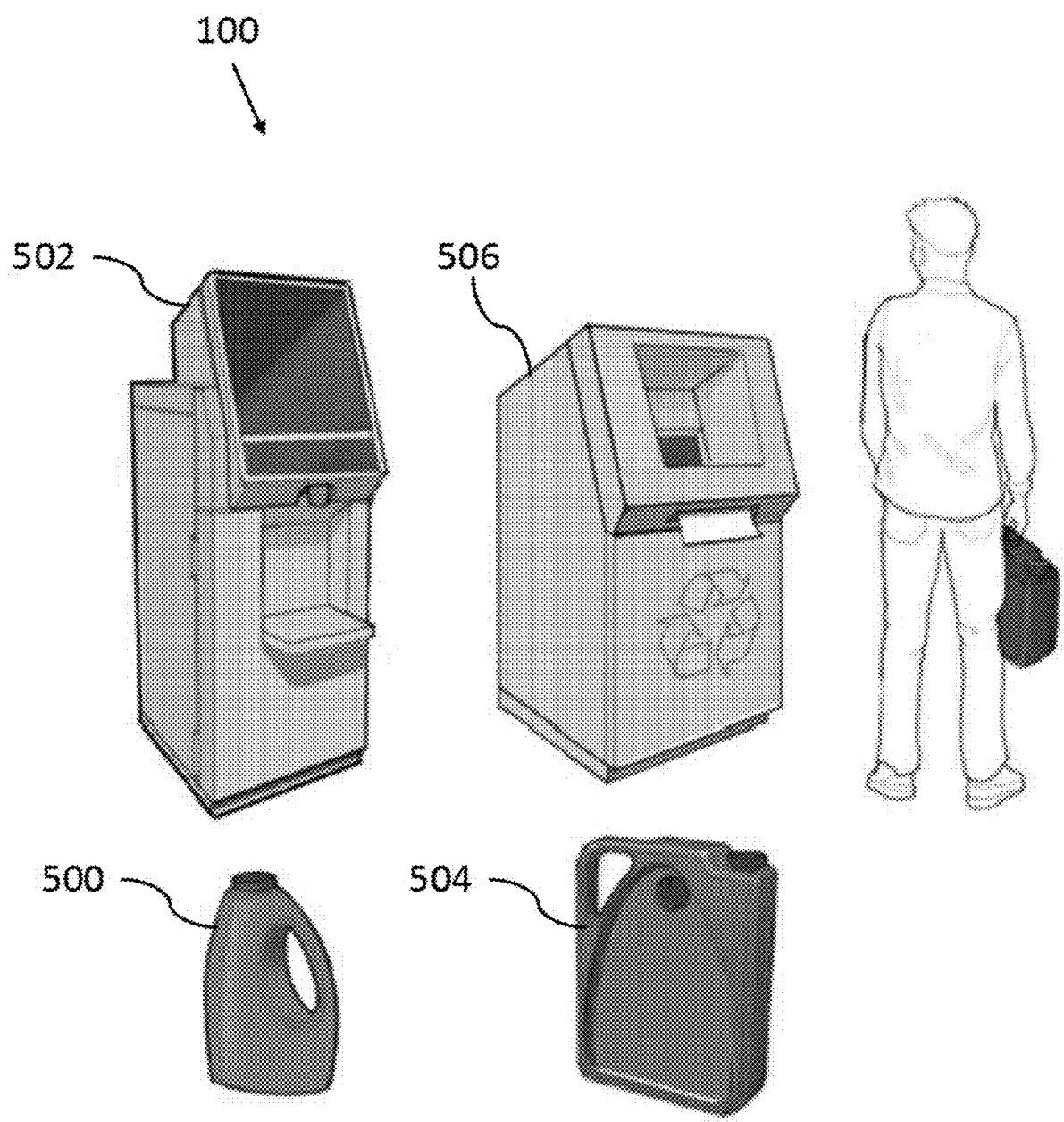
FIG. 5 shows an example of the motor oil refill system including a dispensing kiosk and a recycle kiosk.

FIG. 5 shows an example that the motor oil refill system 100 may include a dispense container 500 (e.g., the refillable container 104) for receiving new motor oil, a dispensing kiosk 502 (e.g., the dispensing system 102), a used motor oil container or a recycle container 504, and a recycle kiosk 506 (e.g., the motor oil collection system 108). The motor oil refill system 100 is designed to replace single use plastic oil containers with reusable, durable oil containers (e.g., the refillable container 104, the dispense container 500). Customers purchase their first container and reuse it as needed. New motor oil is dispensed from the dispensing kiosk 502. Used motor oil is returned to the retail store in a proprietary used oil return container or customer provided container (e.g., the used motor oil container 504). Used motor oil is deposited in a used oil kiosk (e.g., the recycle kiosk 506) or the store's existing used motor oil tank. The dispense container 500 may be a durable plastic or metal container and may include an identification tag for customer look up and rewards information. Furthermore, the dispense container 500 may be designed for transport, enhanced handling and pouring, with space saving/collapsible options. The dispensing kiosk 502 includes an interface/display for profile look-up, oil selection, rewards, payment, etc. The exact amount of oil is purchased and dispensed. The dispensing kiosk 502 is designed with spill-proof and fail-safe dispensing into the dispense containers 500. The dispensing kiosk 502 is designed with solutions to address hands-free filling, single or multiple users. The dispensing kiosk 502 may be further designed with solutions to store reusable motor oil containers (e.g., the refillable containers 104) and used motor oil containers (e.g., the used motor oil containers 504). The used motor oil container 504 is designed for transport, enhanced handling and pouring, and may include an identification tag for ownership identification and/or for issuing vessel return credits. The recycle kiosk 506 is designed to have a bulk used motor oil storage to provide spill-free/splash-free return motor oil containment.

Figure 6:
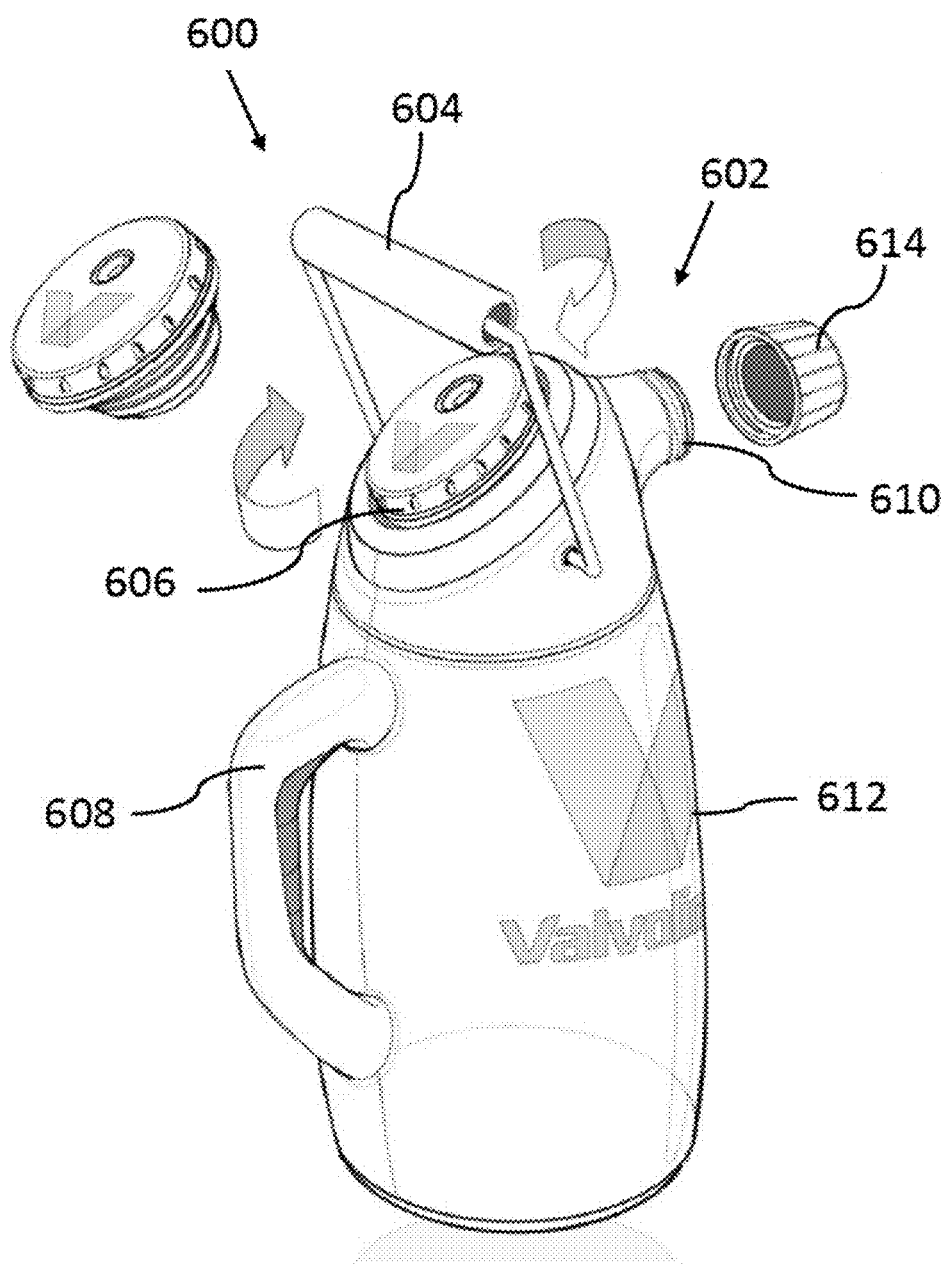
FIG. 6 shows an example of the refillable container.

FIG. 6 shows an example of a dispense container 600 (e.g., the refillable container 104). The dispense container 600 is built for transport and pouring with a durable pouring pitcher 602. A carry handle 604 folds for access to an angled fill port 606. A fixed pouring handle 608 and a side mounted pour spout 610 allowing filling without completely up-ending the container dispense 600. A translucent 6-8 quart (e.g., or any other suitable volume/capacity) oil reservoir 612 reveals the motor oil level. The carry handle 604 is a folding wire handle with a wide base for stability and transport. For easy handling, the fixed pouring handle 608 is a molded add-on, non-slip, and side handle. For filling, after registering the dispense container 600 using the dispensing kiosk 502, the angled fill port 606 can be pierced with a fill nozzle (e.g., the angled fill port 606 may be a one-way fill port). The dispense container 600 may further include a screw-on cap 614 that is removably capping the side mounted pour spout 610. The oil reservoir 612 may be a translucent blow-molded reservoir such that the motor oil level is visible. The oil reservoir 612 may have a capacity of 6-8 quarts, or any other capacity. The angled fill port 606 is removable (e.g., screwed to open or tightened) for cleaning the dispense container 600.

Figure 7:
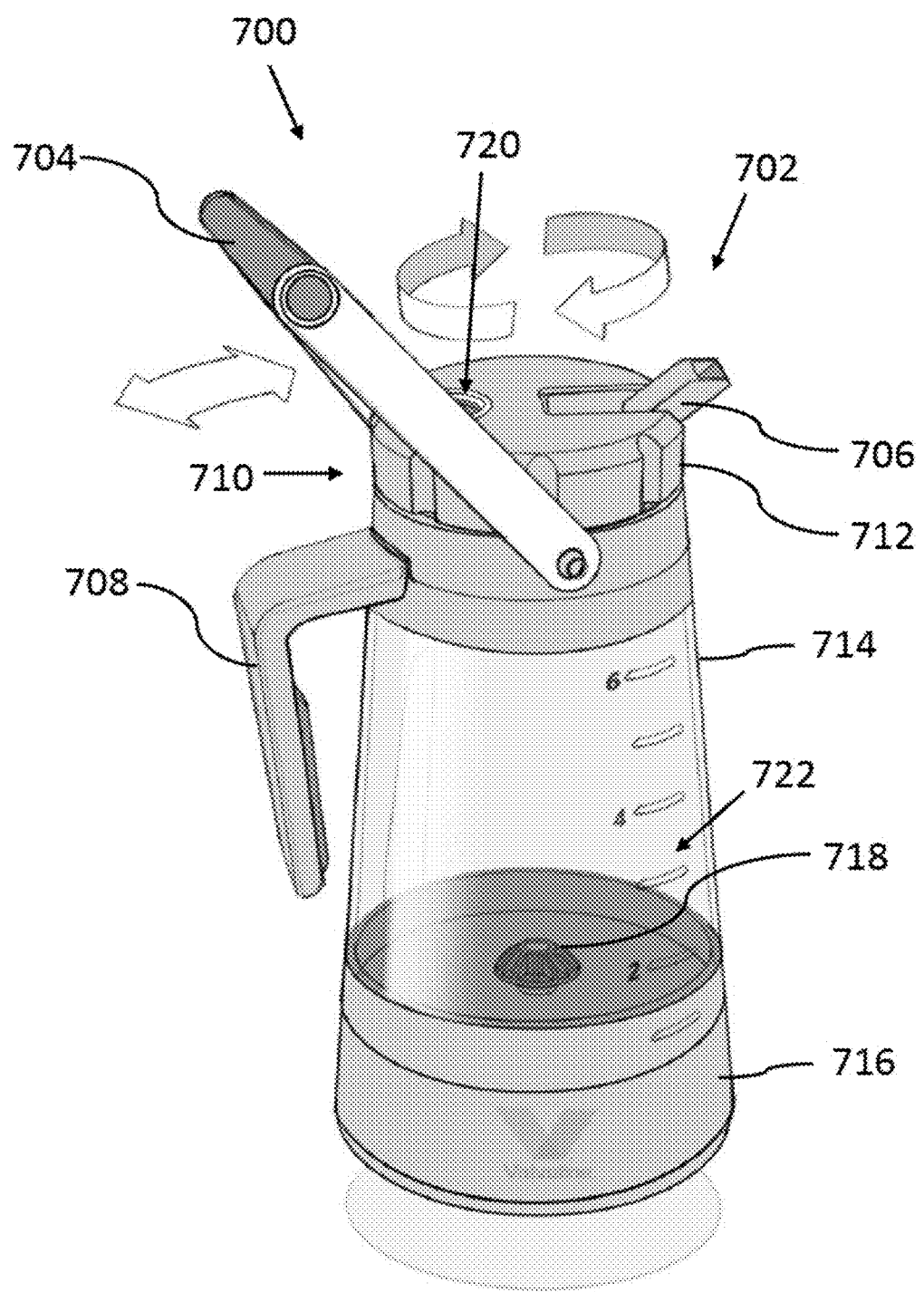
FIG. 7 shows another example of the refillable container.

FIG. 7 shows an example of a dispense container 700 (e.g., the refillable container 104). The dispense container 700 is built for transport and pouring with a durable pouring pitcher 702. The dispense container 700 includes a folding carry handle 704 and a flip-out pouring spout 706. A fixed open-ended handle 708 is attached to the side of an upper cover assembly 710. A cover 712 of the upper cover assembly 710 is removable for cleaning as needed (e.g., the cover 712 may be be screwed on in a first direction to be tightened and screwed in a second direction opposite to the first direction to be loosened). A clear 6-quart (or any other capacity) reservoir 714 is sandwiched between the upper cover assembly 710 and a base 716. The base 716 includes an impeller 718 for mixing additives. For easy transport, the fixed open-ended handle 708 may be made of folding metal with a wide base for stability. For easy handling, the fixed open-ended handle 708 is a molded open-ended side handle. For filling, after registering the dispense container 700 using the dispensing kiosk 502, a one-way fill port 720 in the cover 712 can be pierced with a fill nozzle. The flip-open pouring spout 706 allows motor oil to flow for pouring. The reservoir 714 may be a translucent or clear reservoir with quarter markings 722 such that the motor oil level is visible. The dispense container 700 may be made with injection molded oil resistant parts for durability. The dispense container 700 may have a capacity of 6-8 quarts, or any other capacity.

Figure 8:
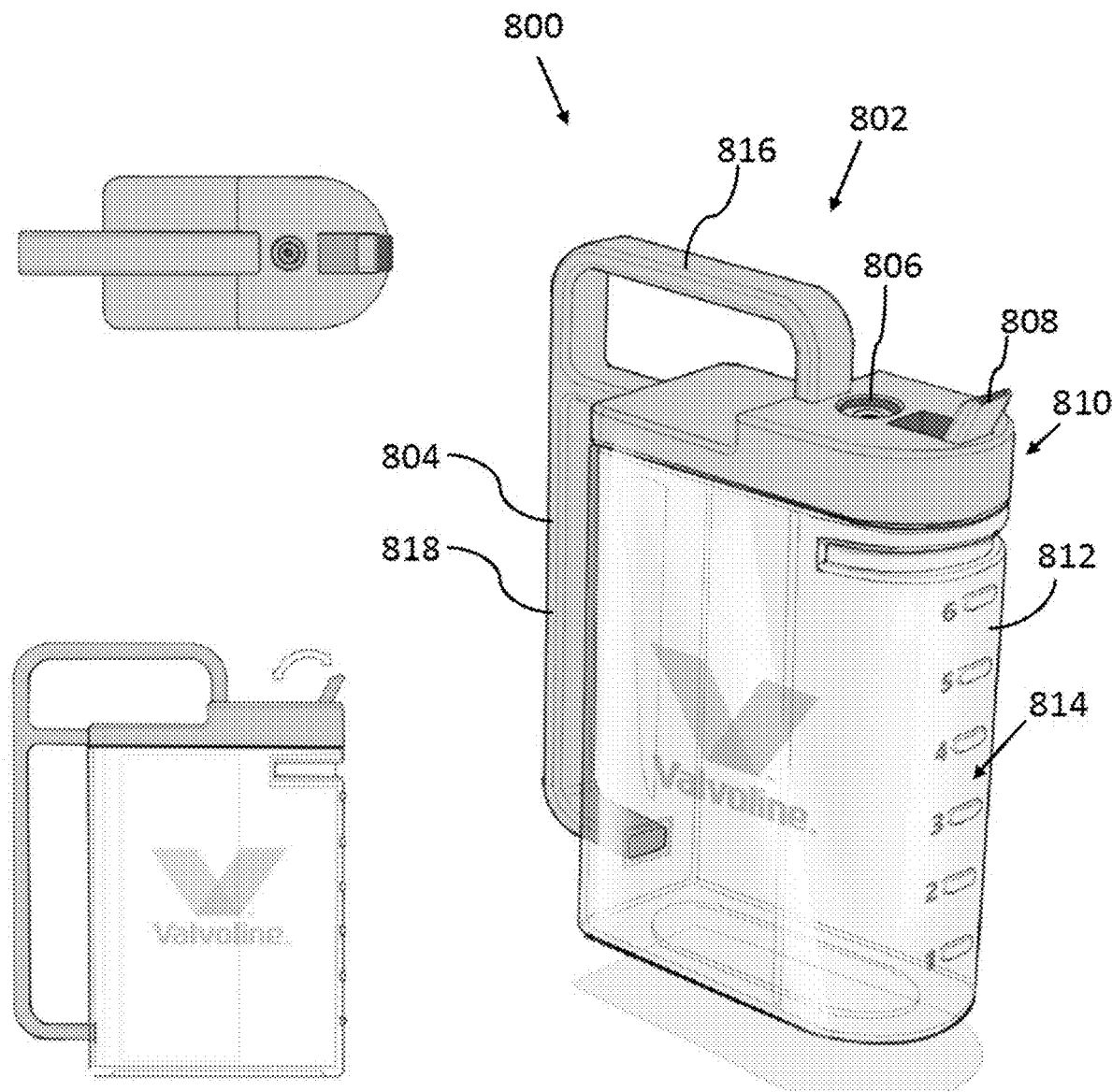
FIG. 8 shows another example of the refillable container.

FIG. 8 shows an example of a dispense container 800 (e.g., the refillable container 104). The dispense container 800 is built for transport and pouring with a durable pouring pitcher 802. The dispense container 800 includes an integrated carry/pouring handle 804. The dispense container 800 includes a one-way fill port 806 and a flip-out spout 808 molded into a cover assembly 810. A translucent or clear 6-quart (or any other volume/capacity) reservoir 812 includes markings 814 to show fill levels (e.g., every centimeter, every inch, etc.) of the container capacity. The shape of the dispense container 800 is made to insert into an opening of the dispensing kiosk 502 and register with a refill mechanism. For easy transport and handling, the handle 804 includes an integrated top carry handle 816 and an integrated side handle 818. For filling, the one-way fill port 806 can be pierced with a fill nozzle. The flip-open pouring spout 808 allows motor oil to flow for pouring. The oil level is visible through the translucent or clear reservoir 812 with the markings 814. The dispense container 800 is made with injection molded oil resistant parts for durability. The dispense container 800 may have a capacity of 6 quarts, or any other capacity.

Figure 9:
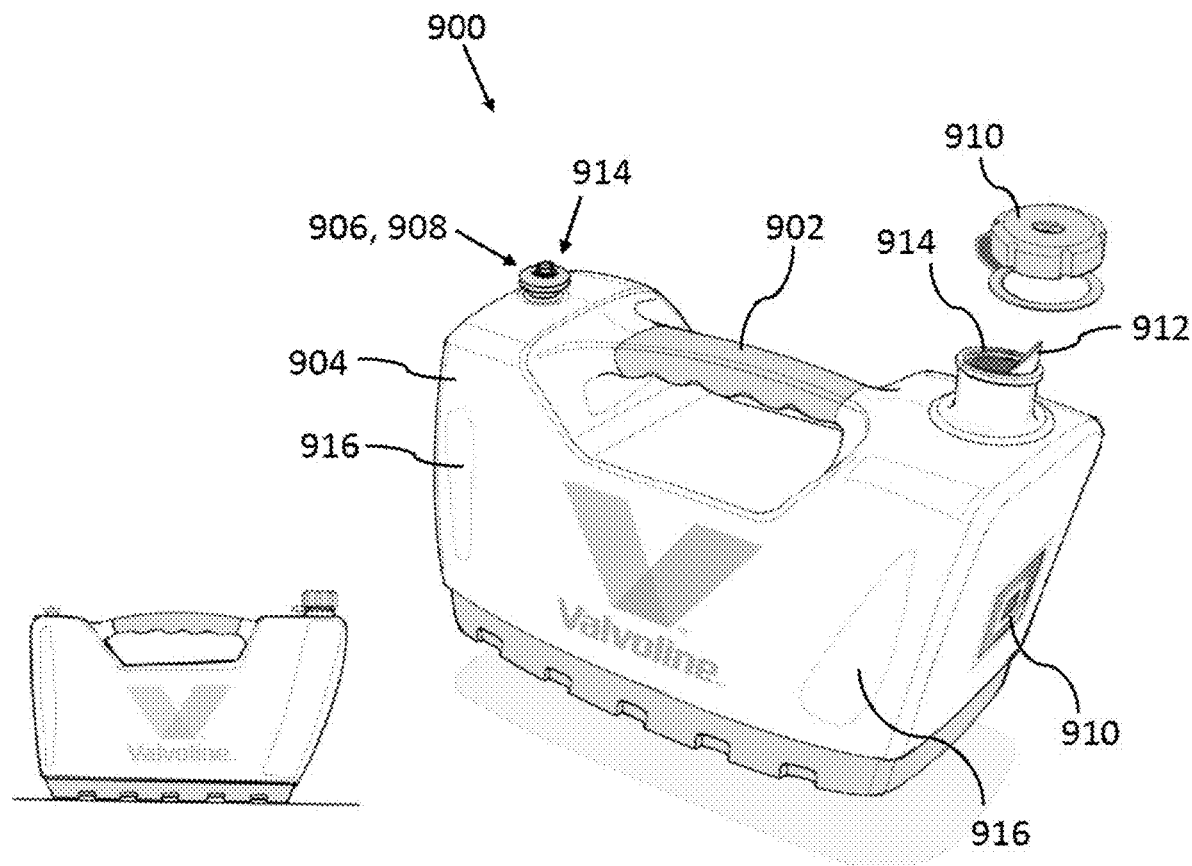
FIG. 9 shows another example of the refillable container.

FIG. 9 shows an example of a dispense container 900 (e.g., the refillable container 104) built for stability during vehicle transport and pouring. The dispense container 900 includes an integrated carry handle 902 that is molded into a low-profile tank 904. The dispense container 900 includes a kiosk fill port 906 that is molded into a removable cap 908. The tank 904 has a low-profile shape that can be easily adapted to larger tank sizes. The dispense container 900 further includes an identification label 910 (e.g., RFID label, IQ code, etc.) shown for customer identification and loyalty programs. The integrated carry handle 902 is an integrated top carry handle for transport/handling. The kiosk fill port 906 is a one-way fill port that can be pierced with a fill nozzle for filling. The dispense container 900 further includes a removable cap 910, an integrated spout 912, and an air vent 914 for anti-plug during pouring. The oil level is visible through a molded oil level window 916. The dispense container 900 is made with injection molded oil resistant parts for durability. The dispense container 900 may have a capacity of 8 quarts, or any other capacity.

Figure 10:
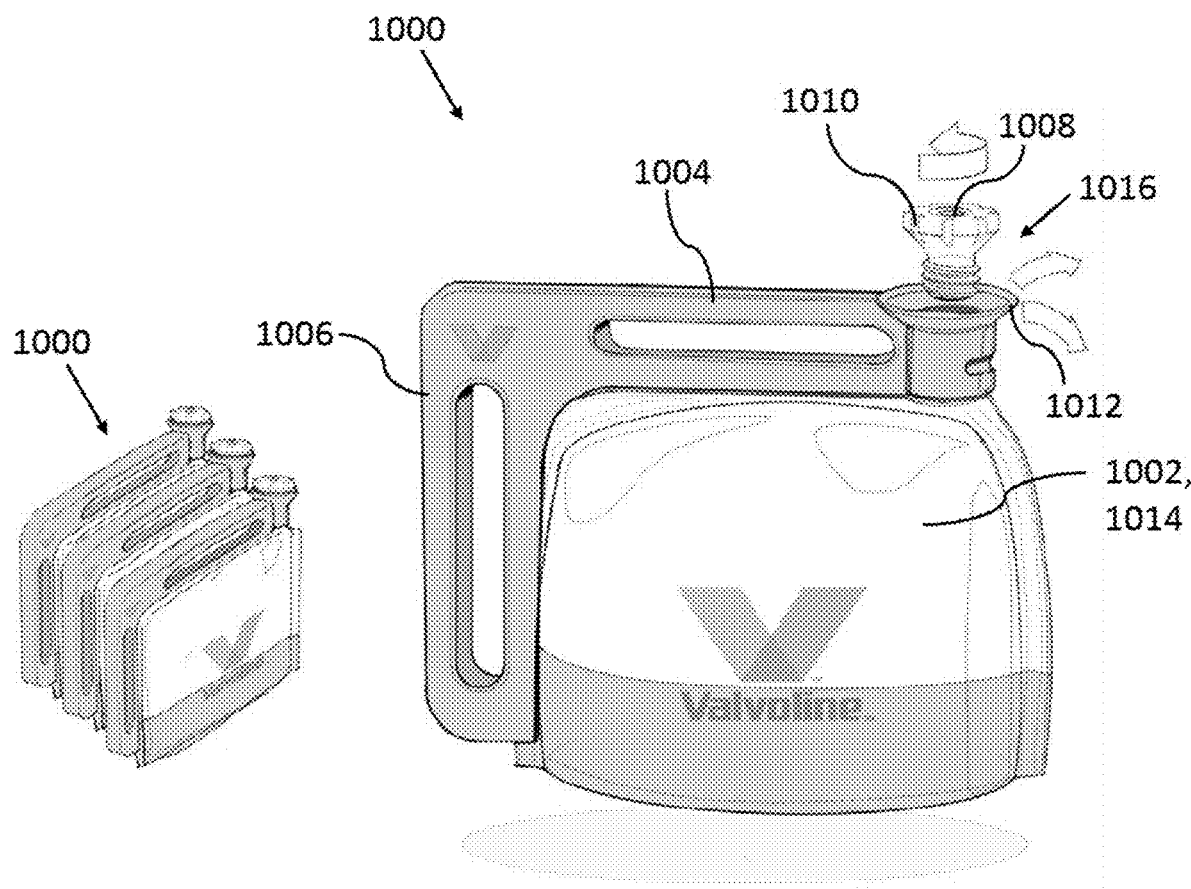
FIG. 10 shows another example of the refillable container.

FIG. 10 shows an example of a dispense container 1000 (e.g., the refillable container 104) built for sustainable packaging with a space saving durable pouch 1002. A rigid durable container would take up a lot of space at retail, prior to filling, and while shipping it to the stores. The pouch approach takes up less room at retail and ships more units in smaller boxes. The pouch 1002 may be in the form of a flexible pouch, a bladder. The dispense container 1000 includes an integrated top carry handle 1004 for transport and an integrated side handle 1006 for handling. A one-way fill port 1008 is integrated into a removable cap 1010. For example, the removable 1010 can be screwed in a first direction to be loosened/open and in a second direction, opposite to the first direction, to be tightened/close. The dispense container 1000 also includes an integrated spout 1012 and a flexible bladder 1014 with an anti-plug feature 1016 (for pouring/venting). The dispense containers 1000 may be stacked together to minimize the space/volume occupied. The visibility of the oil level depends on the translucency of the bladder material. The bladder material may be chosen such that the oil level is visible or not visible. The dispense container 1000 is made with puncture resistant flexible or semi-flexible material. The dispense container 1000 may have a capacity of 5-6 quarts, or any other capacity.

Figure 11:
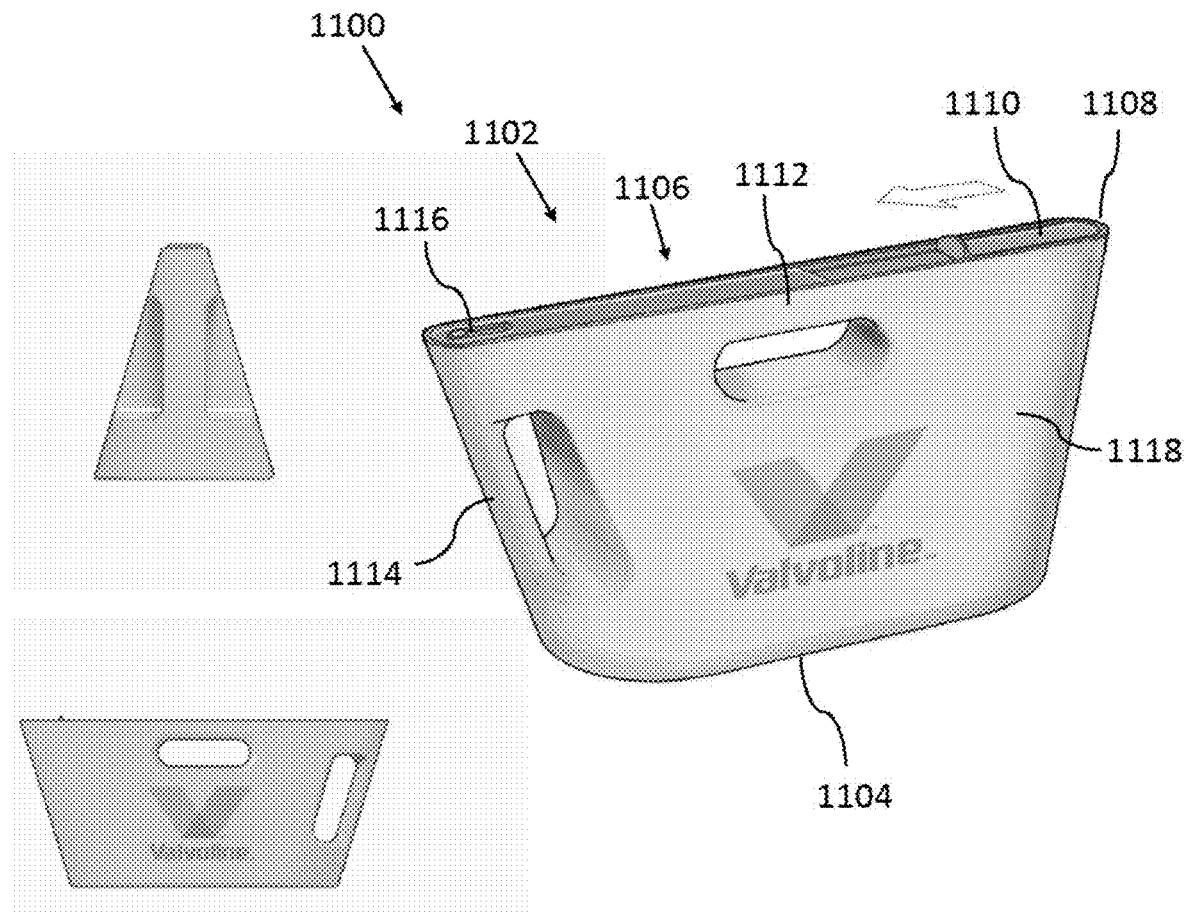
FIG. 11 shows another example of the refillable container.

FIG. 11 shows an example of a dispense container 1100 (e.g., the refillable container 104) built for sustainable packaging with a space saving pour 1102. The dispense container 1100 includes a homogeneous lower vessel shape 1104 and a vented top assembly 1106 that gives access to the motor oil. The dispense container 1100 includes a pour spout 1108 and a sliding spout cover seal 1110 for transport and opening for filling and pouring. The dispense container 1100 includes an integrated top carry handle 1112 for transport and an integrated side handle 1114 for handling. The dispense container 1100 is filled through the pour spout 1108. The sliding spout cover seal 1110 can be slid open for filing and pouring. The dispense container 1100 may further include a sliding vent 1116 configured to prevent glugging if needed. The dispense container 1100 may include a translucent or clear window 1118 such that the oil level is visible through the window 1118. The dispense container 1100 is made with blow-molded construction parts for durability. The dispense container 1100 may have a capacity of 5-6 quarts, or any other capacity.

FIG. 12 through FIG. 15 show various examples of the dispensing kiosk 502 (e.g., the dispensing system 102).

Figure 12:
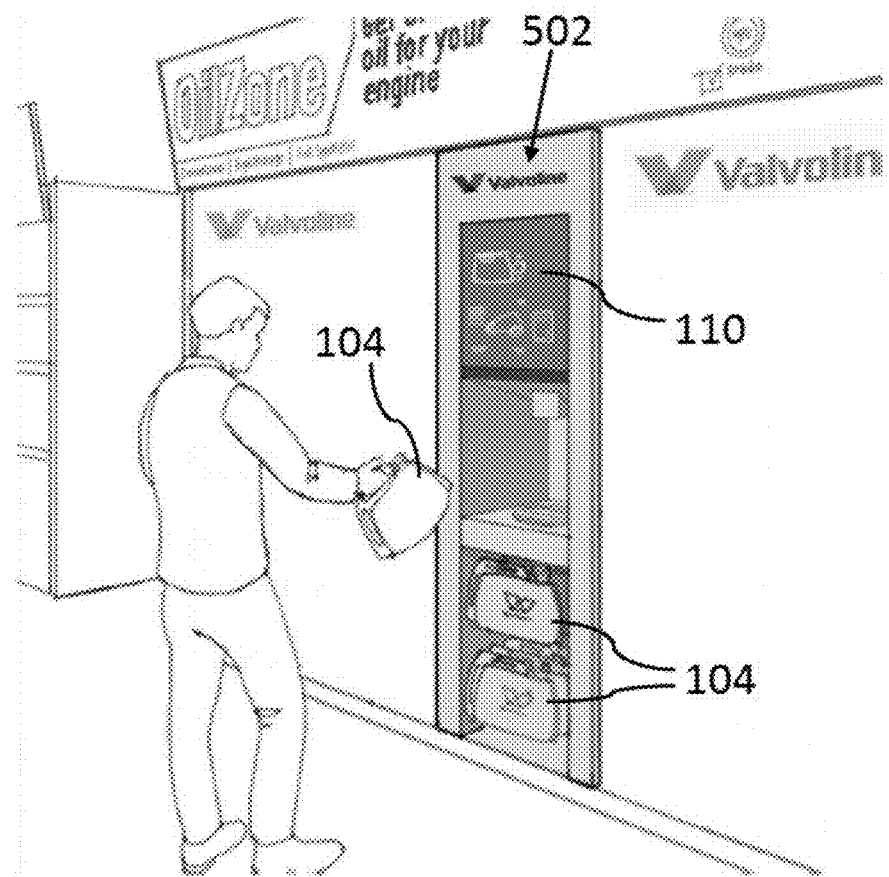
FIG. 12 shows another an example of the dispensing kiosk.

FIG. 12 shows a self-service dispensing kiosk 502 allowing users/customers to refill their refillable container 104. A customer logs in via a touch screen (e.g., the user interface 110) and the vehicle information and motor oil history are displayed. A user or customer may select motor oil of choice, and the dispensing kiosk 502 dispenses the exact amount needed. The refillable container 104 is identified by the dispensing kiosk 502 via an identification technology (e.g., RFID, QR code, etc.). The dispensing kiosk 502 is an interface between the customer and a larger bulk oil system (e.g., the supply system 106) behind the wall. The refillable container 104 is configured to interlock with the dispensing kiosk 502 for spill free filling. The lower area of the dispensing kiosk 502 may store multiple refillable containers 104.

Figure 13:
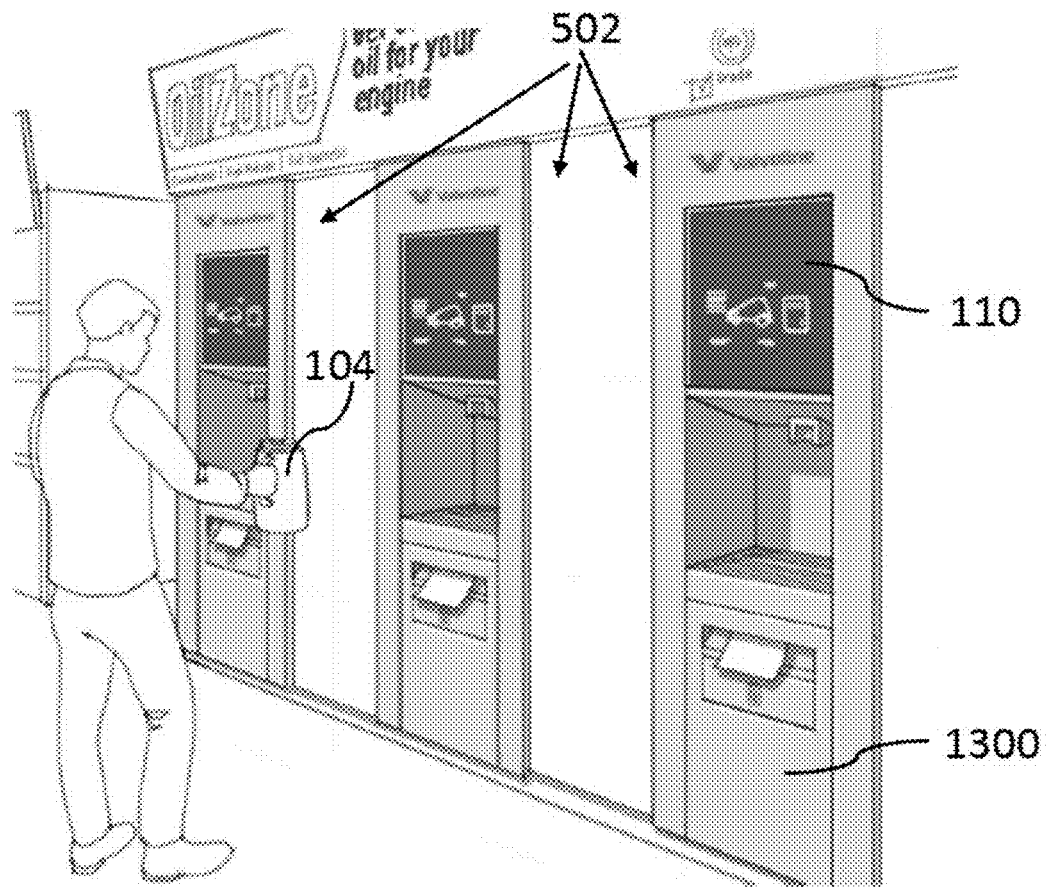
FIG. 13 shows another example of multiple dispensing kiosks.

FIG. 13 shows multiple dispensing kiosks 502 allowing multiple customers to dispense motor oil at one time. Store staff can assist one customer while other customers fill their refillable containers 104. The dispensing kiosk 502 may include a lower cabinet 1300 for storage.

Figure 14:
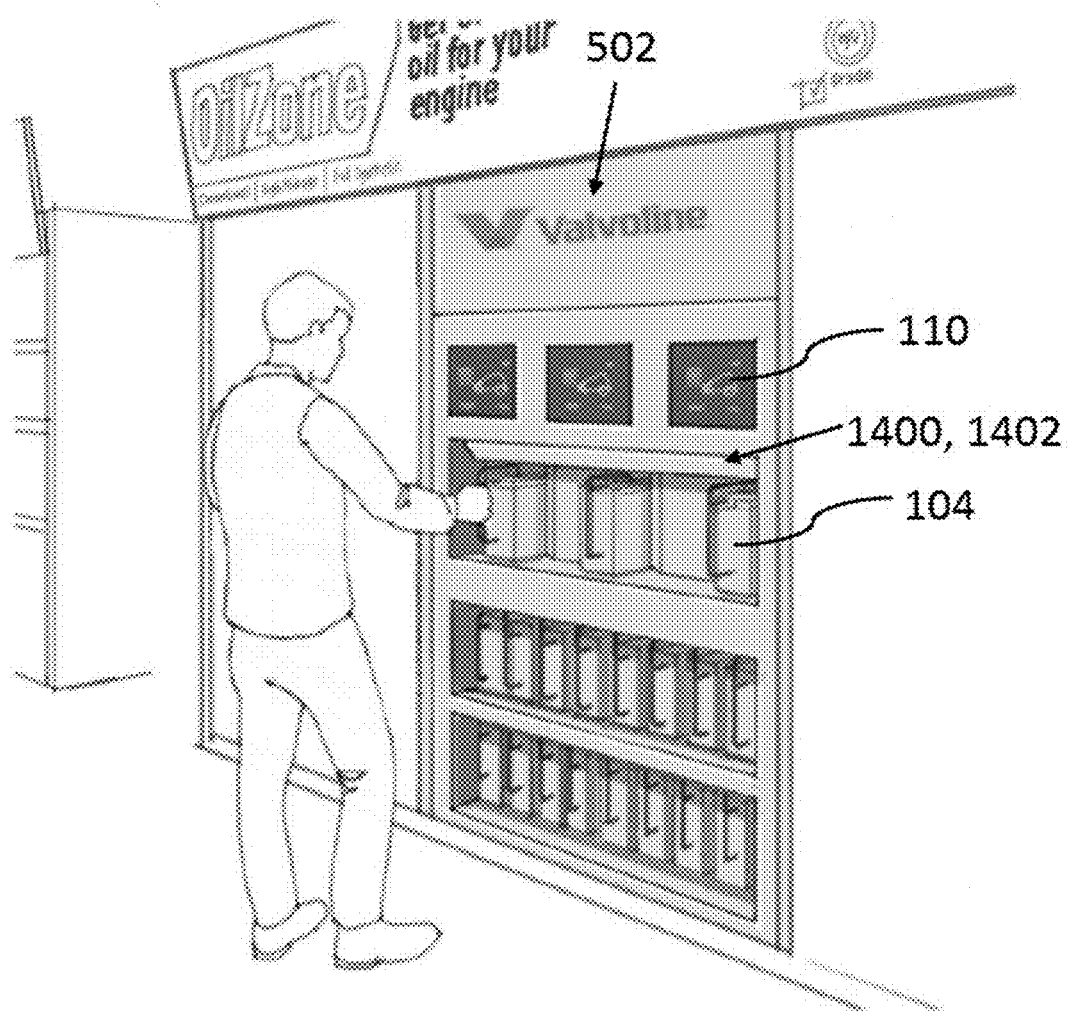
FIG. 14 shows another example of the dispensing kiosk.

FIG. 14 shows the dispensing kiosk 502 with multiple dispensing ports 1400 allowing multiple customers to use simultaneously. The dispensing kiosk 502 includes plug-in mechanism 1402 configured to receive the refillable containers 104. The plug-in mechanism 1402 keeps the dispensing ports 1400 hidden from view and mess is contained.

Figure 15:
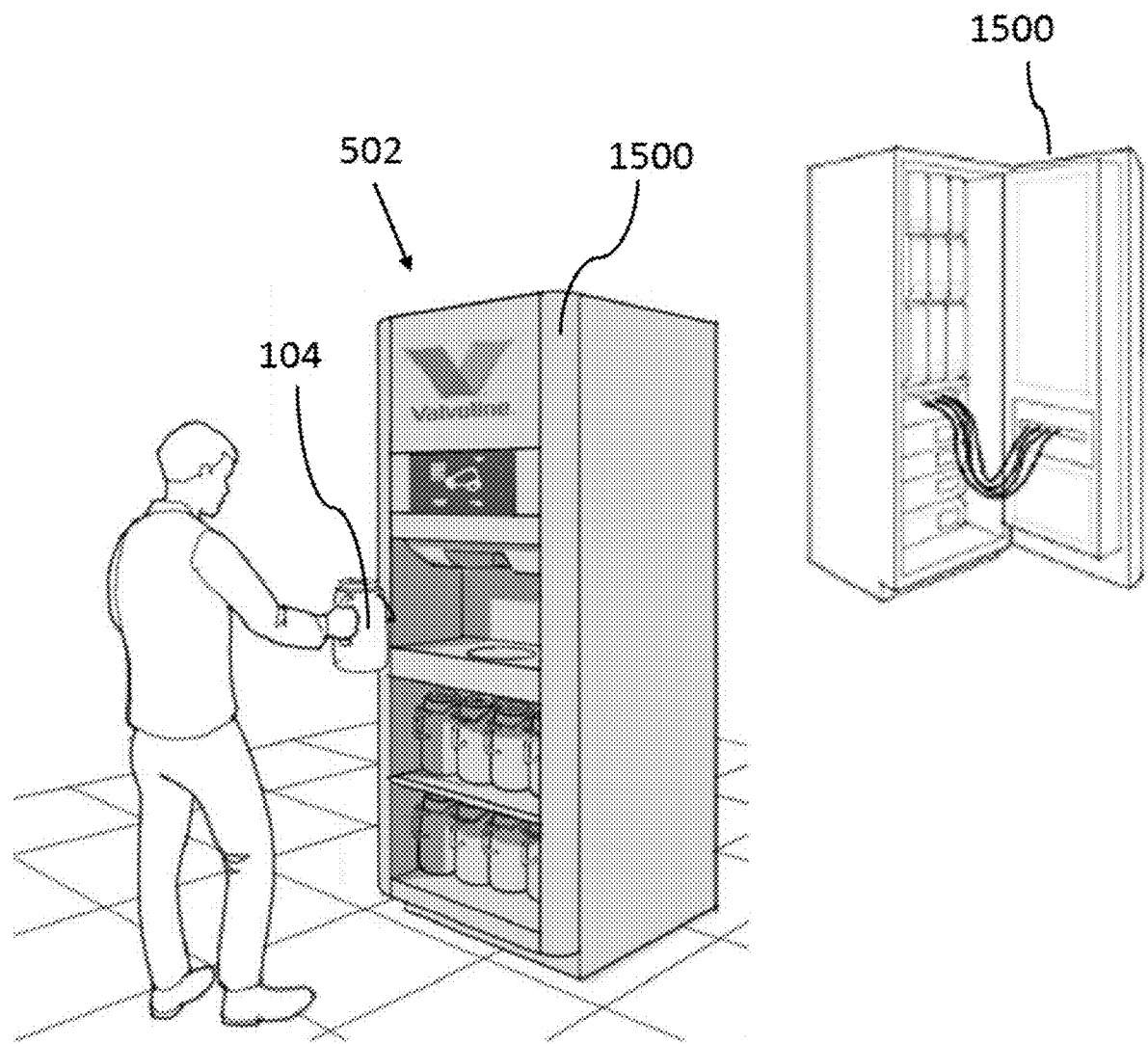
FIG. 15 shows another example of the dispensing kiosk.

FIG. 15 shows the dispensing kiosk 502 that is a free-standing kiosk with a self-contained bulk oil system. The free-standing dispensing kiosk 502 can be located anywhere in a store. The refillable container 104 engages with the dispensing kiosk 502 with a spill-free coupling mechanism. Multiple refillable containers 104 may be stored in the lower compartment of the dispensing kiosk 502. A front panel 1500 of the dispensing kiosk 502 may be opened for servicing and restocking oil and additives. The bulk oil storage is inside the dispensing kiosk 502.

FIG. 16 through FIG. 21 show various examples of the recycle kiosk 506 (e.g., the motor oil collection system 108).

Figure 16:
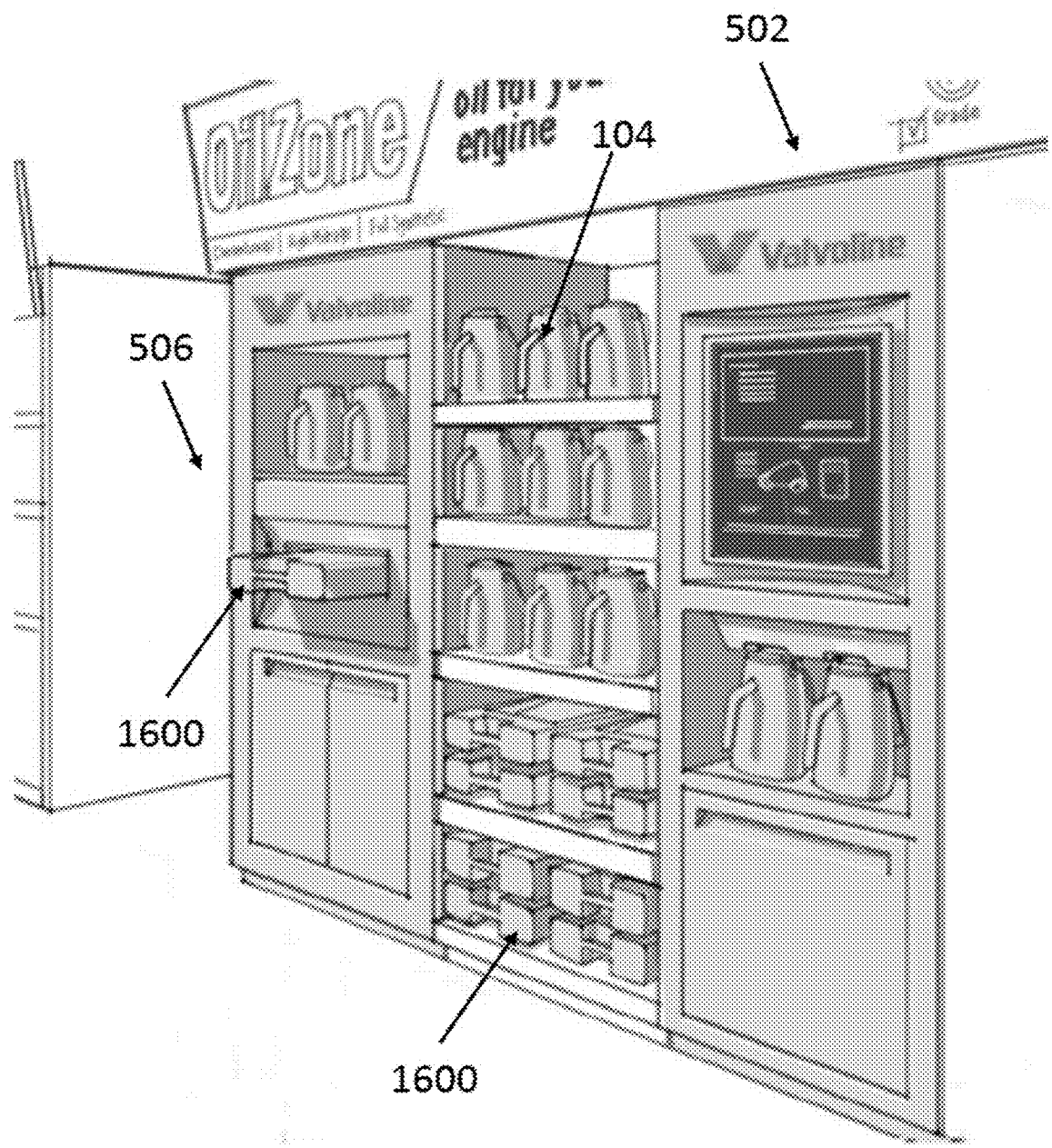
FIG. 16 shows an example of the motor oil refill system including a dispensing kiosk and a recycle kiosk.

FIG. 16 shows an example that the recycle kiosk 506 is combined with the dispensing kiosk 502, and each unit is self-contained. A used motor oil or recycling container 1600 may be both a drip pan and a transport vessel. The used motor oil container 1600 is configured to plug into the recycle kiosk 506 to provide a no spill experience to customers.

Figure 17:
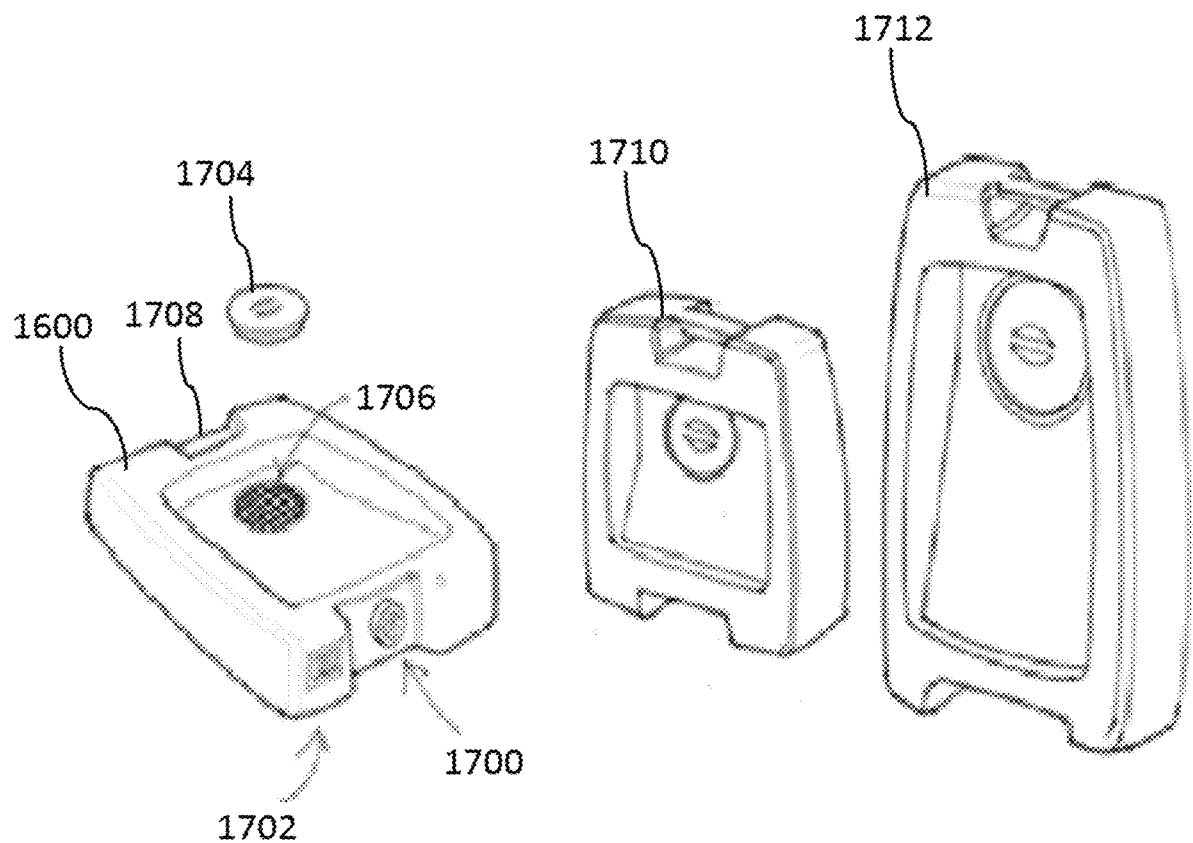
FIG. 17 shows examples of used motor oil containers.

FIG. 17 shows examples of the used motor oil container 1600. The used motor oil container 1600 is built for no-spill with a one-way drain or one-way empty valve 1700, an identification tag 1702 (e.g., RFID, QR code, barcode, etc.), a drain cover 1704, a drain screen 1706, and a handle 1708 for transport (e.g., one-hand transport). The used motor oil container 1600 may be sized at any suitable volume/capacity to fit the vehicle. For example, the used motor oil container 1600 may be a 16 quart (4 gallon) used motor oil container 1710 or may be a 24 quart (6 gallon) used motor oil container 1712.

Figure 18:
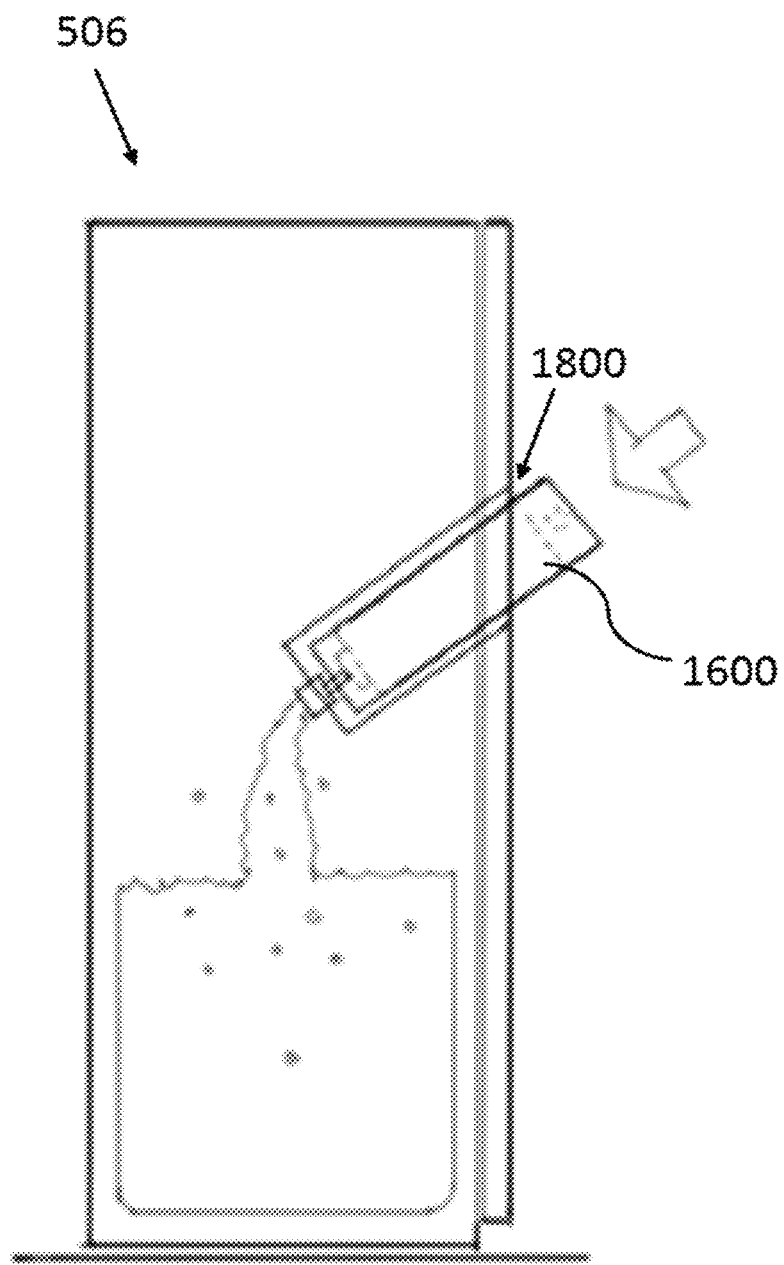
FIG. 18 shows an example of the used motor oil container recycled by the recycle kiosk.

As shown in FIG. 18, the used motor oil container 1600 is shaped and sized to plug into an opening 1800 in the recycle kiosk 506. The opening 1800 is one size and capable of receiving/accommodating the used motor oil containers 1600 of various sizes (e.g., 16 quarts, 24 quarts, etc.). The identification tag 1702 on the used motor oil container 1600 allows the recycle kiosk 506 to identify ownership of the used motor oil container 1600 for vessel return credit.

Figure 19:
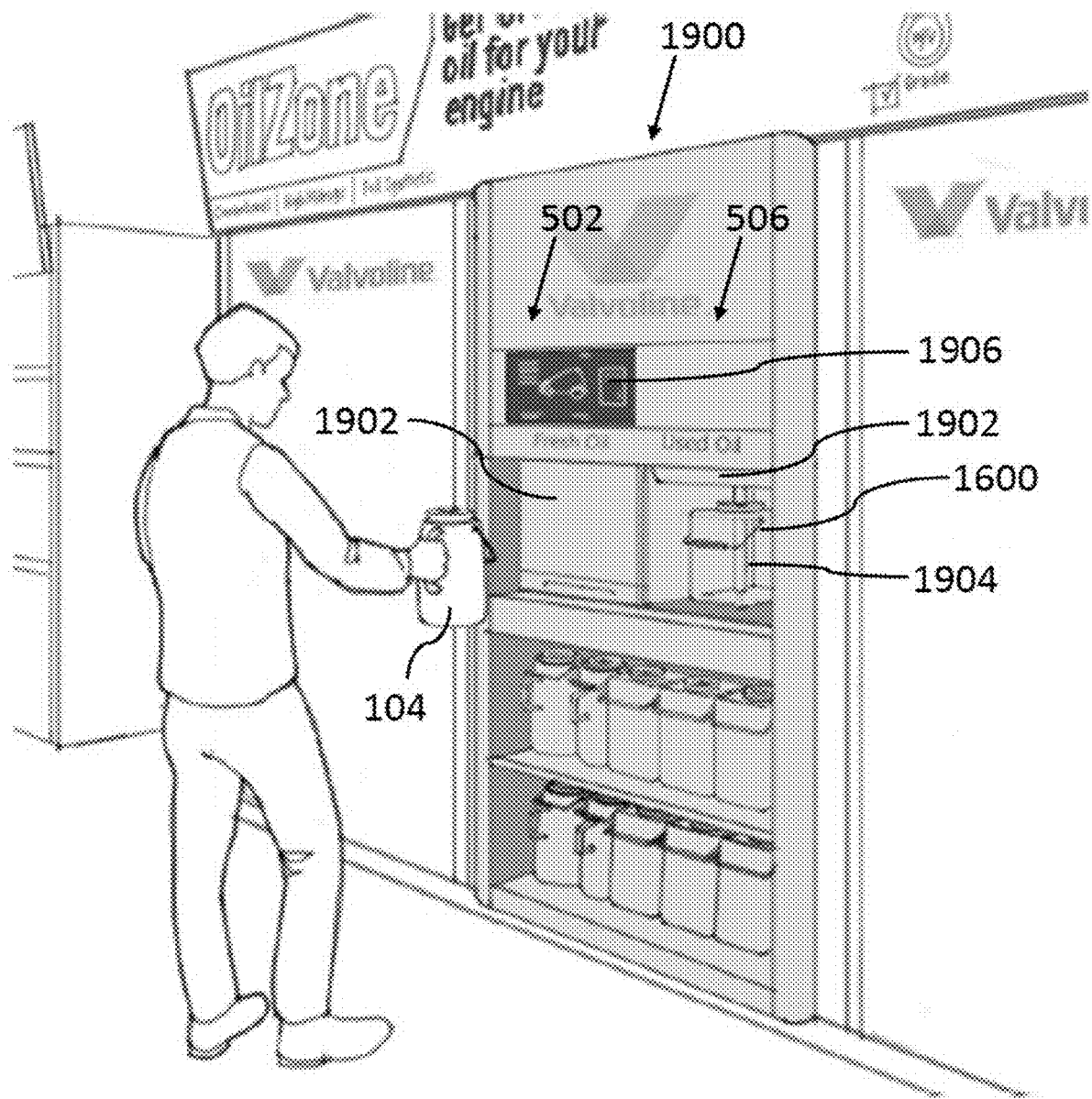
FIG. 19 shows an example of the motor oil refill system including a dispensing kiosk and a recycle kiosk.

FIG. 19 shows an example kiosk 1900 including both the dispensing kiosk 502 and the recycle kiosk 506 in one. The dispensing and recycling happen behind protective sliding doors 1902 to ensure containment of oil while allowing a visual line of sight to the process. A customer places a container (e.g., the refillable container 104 and/or the used motor oil container 1600) inside the enclosure and the kiosk 1900 dispenses new motor oil into the refillable container 104 and/or remove used motor oil from the used motor oil container 1600 via a suction nozzle or pipe 1904. A single display 1906 controls both the dispensing kiosk 502 and the recycle kiosk 506. The kiosk 1900 may protrude from the wall to bring focus to the kiosk.

Figure 20:
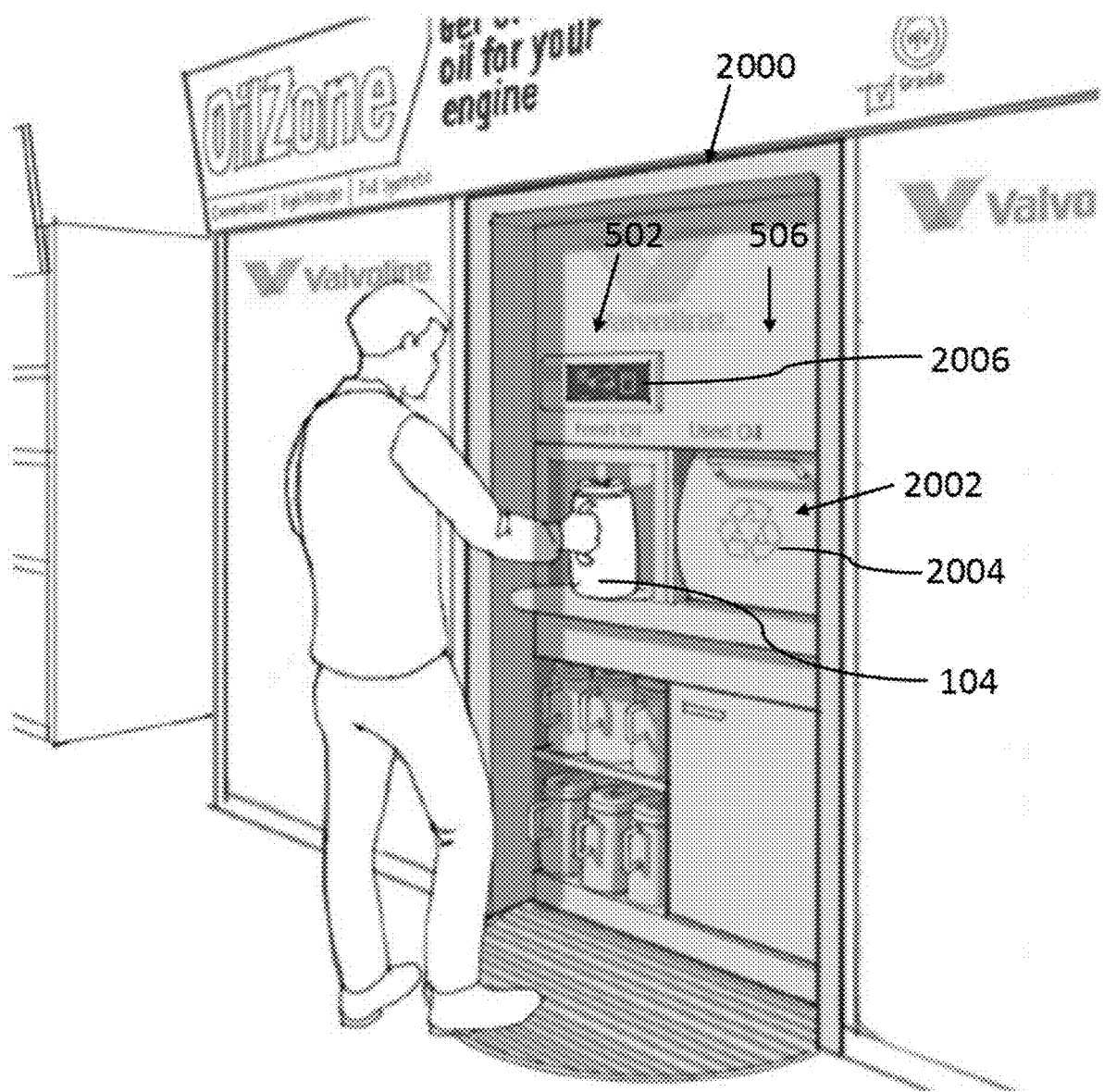
FIG. 20 shows another example of the motor oil refill system including a dispensing kiosk and a recycle kiosk.

FIG. 20 shows another example kiosk 2000 including both the dispensing kiosk 502 and the recycle kiosk 506 in one. The kiosk 2000 includes a tip tank enclosure 2002 such that the used motor oil container 1600 can be placed inside a used oil port 2004 and tipped to drain used motor oil into a tank below to contain spillage and protect customers from spillage. An identification tag on the used motor oil container 1600 identifies ownership of return oil vessel for credit. A single display 2006 controls both the dispensing kiosk 502 and the recycle kiosk 506. The kiosk 2000 may be recessed into the wall to create a more enclosed area for oil dispensing and recycling.

Figure 21:
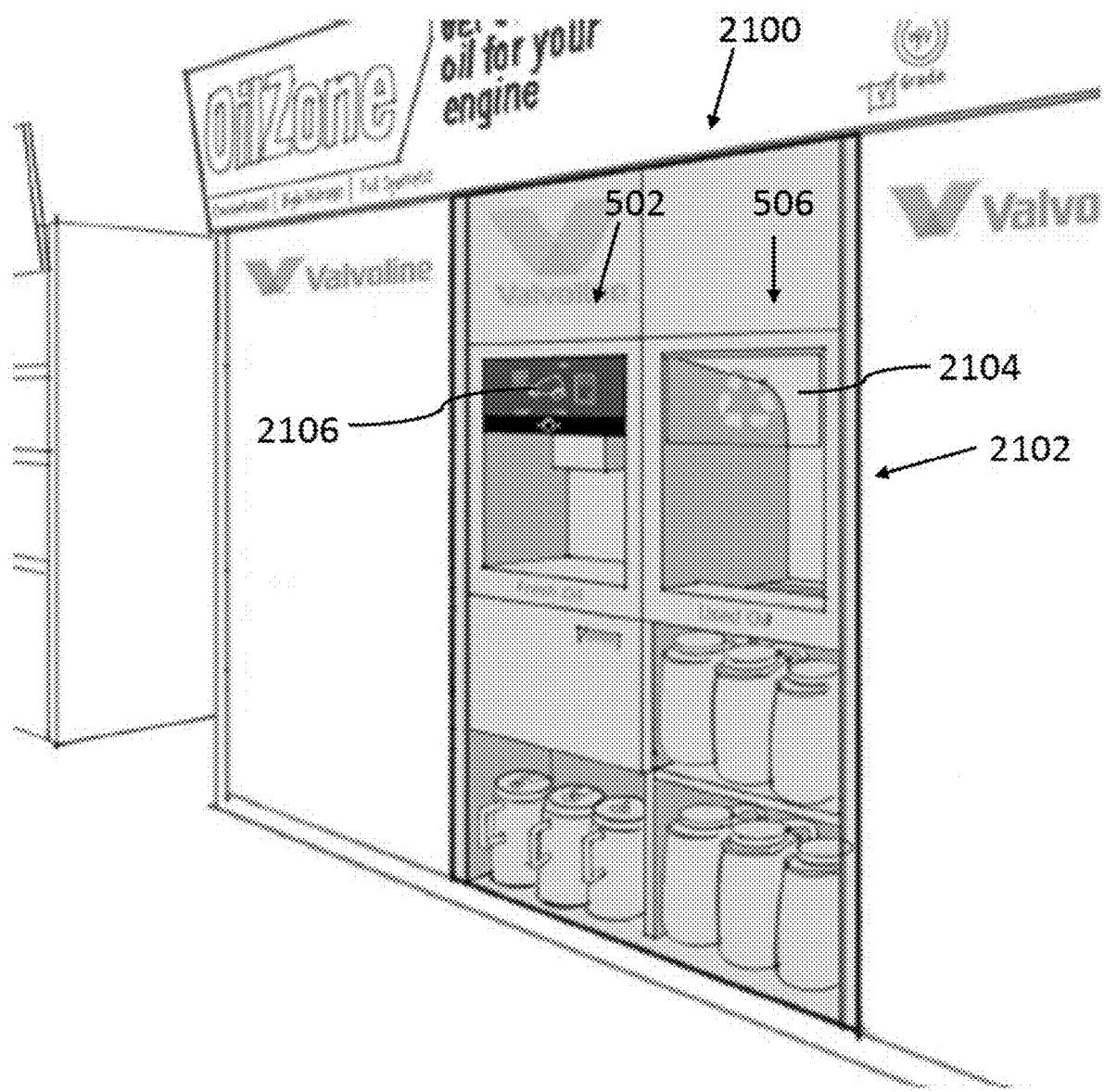
FIG. 21 shows another example of the motor oil refill system including a dispensing kiosk and a recycle kiosk.

FIG. 21 shows another example kiosk 2100 including both the dispensing kiosk 502 and the recycle kiosk 506 in one. The kiosk 2100 includes a pour station 2102 that allows customers to manually pour their used motor oil containers 1600 into a tank (e.g., to drain used oil into the tank below). The kiosk 2100 includes a glass 2104 to protect customers' eyes from splatter. An identification tag on the used motor oil container 1600 identifies ownership of return oil vessel for credit. A single display 2106 controls both the dispensing kiosk 502 and the recycle kiosk 506.

The recycle kiosk 506 disclosed herein may include components and/or sensors necessary to determine an amount of used motor oil recycled. For example, the recycle kiosk 506 may include a volume sensor and/or a weighing sensor to determine the amount of used motor oil recycled by the recycle kiosk 506. The recycle kiosk 506 may be configured to communicate the used motor oil recycle information (e.g., the used motor oil container ownership information and/or the amount of used motor oil recycle information) to the motor oil management system 202. The motor oil management system 202 may use the used motor oil recycle information to determine the logistics for issuing vessel return credits and/or the logistics for removing or recycling the used motor oil from the motor oil refill system 100. The motor oil management system 202 may also use the communicated information from the dispensing system 102 and/or the motor oil collection system 108 to determine a discount or credit for the customer or user.

Figure 22:
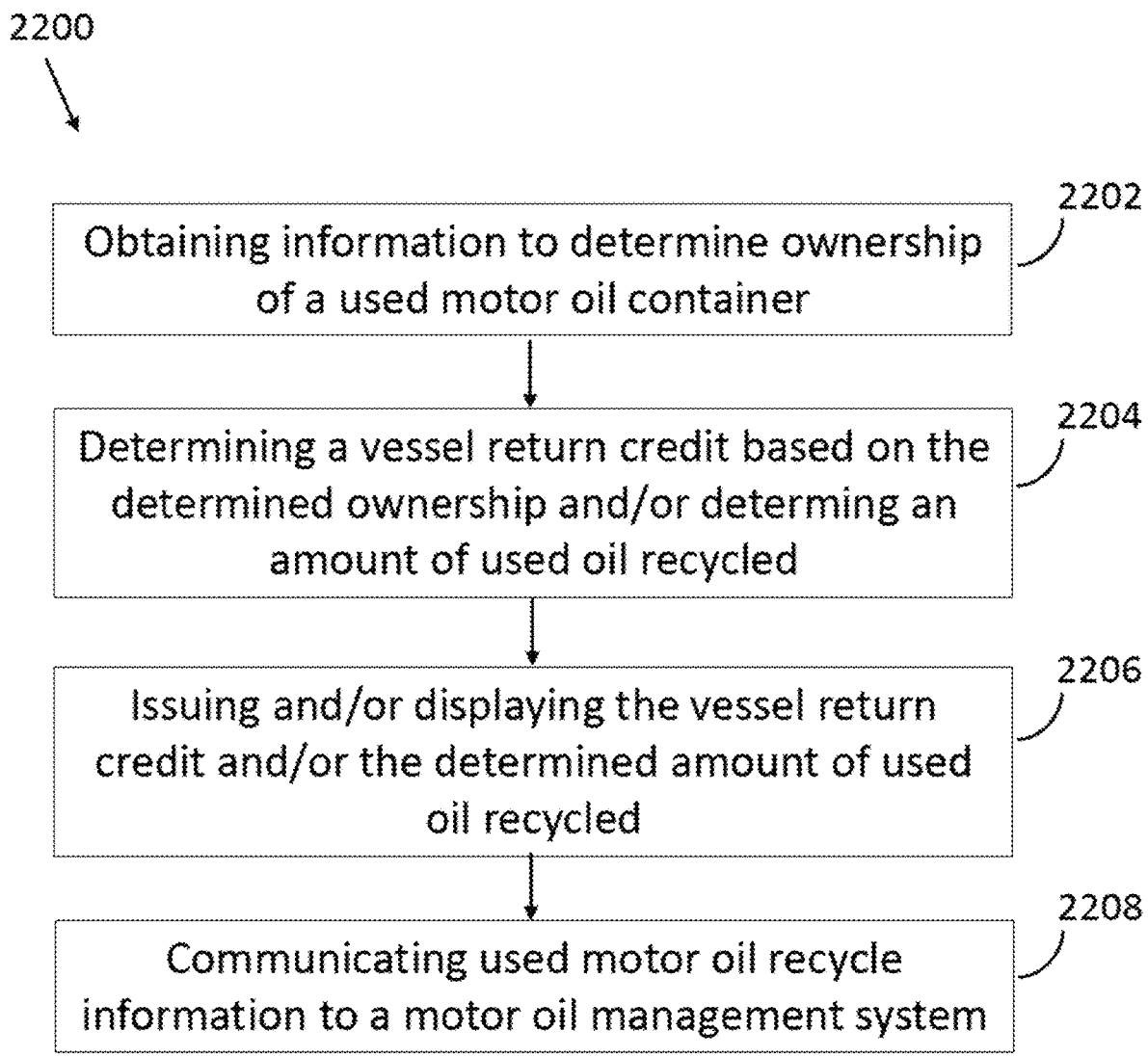
FIG. 22 shows an example process of returning a used motor oil container and/or recycling used motor oil.

FIG. 22 shows an example process 2200 of using the motor oil refill system 100 to collect used motor oil containers and/or used motor oil. The process 2200 includes obtaining information to determine ownership of a used motor oil container (step 2202). The information may be obtained through a user interface or display. For example, a user can enter or select from a display menu to indicate the type and ownership of the mused motor oil container. For example, the user interface may scan or detect the used motor oil container based on an identification tag on the used motor oil container.

The process 2200 includes determining a vessel return credit based on the determined ownership and/or determining an amount of used motor oil recycled (step 2204). The process 2200 includes issuing and/or displaying the vessel return credit and/or the determined amount of used oil recycled (step 2206). The process 2200 may further include communicating used motor oil recycle information to the motor oil management system 202.

The foregoing description of examples has been presented for purposes of illustration and description. It is not intended to be exhaustive or limiting to the forms described. Numerous modifications are possible in light of the above teachings. Some of those modifications have been discussed, and others will be understood by those skilled in the art. The examples were chosen and described in order to best illustrate principles of various examples as are suited to particular uses contemplated. The scope is, of course, not limited to the examples set forth herein, but can be employed in any number of applications and equivalent devices by those of ordinary skill in the art.

The invention claimed is:

1. A motor oil change system comprising:
   refillable motor oil containers;
   one or more motor oil refill systems; and
   a motor oil management system communicatively and/or operatively coupled to the one or more motor oil refill systems via a network that allows data communication between the motor oil management system and the one or more motor oil refill systems,
   wherein each of the one or more oil refill systems comprises:
      a controller or processor;
      a user interface configured to:
         receive data from an information tag of a refillable motor oil container; and
         transmit the data to the controller or processor, wherein the data comprises information of a vehicle type and/or make, and the controller or processor is configured to determine based on the data a type and an amount of motor oil for a refill in precision at point-of-purchase; and
      a dispenser configured to dispense the motor oil of the type and the amount determined by the controller or processor into the refillable motor oil container.

2. The motor oil change system of claim 1, wherein the each of the one or more motor oil refill systems comprises a motor oil collection system configured to collect used motor oil.

3. The motor oil change system of claim 2, wherein the motor oil collection system is configured to receive one or more used motor oil containers and issue a vessel return credit.

4. The motor oil change system of claim 1, wherein the one or more motor oil refill systems are configured to transmit information comprising the type and the amount of motor oil of each refill to the motor oil management system, and a controller or processor of the motor oil management system is configured to determine logistics for supplying motor oil to the one or more motor oil refill systems based on the information.

5. The motor oil change system of claim 1, wherein the data further comprise previous refill history, volume of the refillable motor oil container, and/or vehicle operation history.

6. The motor oil change system of claim 1, wherein the data further comprise information provided by a user to indicate the type and/or the amount of motor oil for the refill.

7. The motor oil change system of claim 2, wherein the data further comprise a type and an amount of used motor oil collected by the motor oil collection system.

8. A method of changing motor oil using a motor oil change system, the motor oil change system comprising:
   refillable motor oil containers;
   one or more motor oil refill systems; and
   a motor oil management system communicatively and/or operatively coupled to the one or more motor oil refill systems via a network that allows data communication between the motor oil management system and the one or more motor oil refill systems, wherein each of the one or more motor oil refill systems comprises a controller or processor, a user interface, and a dispenser, and
   the method comprising:
      receiving, via the user interface, data from an information tag of a refillable motor oil container;
      transmitting, via the user interface, the data to the controller or processor, wherein the data comprises information of a vehicle type and/or make;
      determining based on the data, via the controller or processor, a type and an amount of motor oil for a refill in precision at point-of-purchase; and
      dispensing, via the dispenser, the motor oil of the type and the amount determined by the controller or processor into the refillable motor oil container.

9. The method of claim 8, further comprising collecting used motor oil via a motor oil collection system of the motor oil refill system.

10. The method of claim 8, further comprising collecting one or more used motor oil containers and issuing a vessel return credit, via a motor oil collection system of the motor oil refill system.

11. The method of claim 8, further comprising displaying the type and the amount of the motor oil for the refill, via the user interface.

12. The method of claim 8, further comprising:
   transmitting, via the network, information comprising the type and the amount of motor oil of each refill from the one or more motor oil refill systems to the motor oil management system; and
   determining, via a controller or processor of the motor oil management system, logistics for supplying motor oil to the one or more motor oil refill systems based on the information.

13. The method of claim 8, wherein the data further comprise previous refill history, volume of the refillable motor oil container, and/or vehicle operation history.

14. The method of claim 8, wherein the data further comprise information provided by a user to indicate the type and/or the amount of motor oil for the refill.

15. The method of claim 9, wherein the data further comprise a type and an amount of used motor oil collected by the motor oil collection system.

* * * * *